(12) United States Patent
Murrihy et al.

(10) Patent No.: US 10,034,455 B2
(45) Date of Patent: Jul. 31, 2018

(54) SELF-CLEANING PET GROOMING IMPLEMENT

(71) Applicant: LUMO LLC, Cambridge, MA (US)

(72) Inventors: Brian Murrihy, Cambridge, MA (US); Elizabeth Morrissey, Joppa, MD (US)

(73) Assignee: LUMO LLC, Cambridge, MA (US)

( * ) Notice: Subject to any disclaimer, the term of this patent is extended or adjusted under 35 U.S.C. 154(b) by 0 days.

(21) Appl. No.: 14/972,095

(22) Filed: Dec. 17, 2015

(65) Prior Publication Data
US 2017/0172105 A1   Jun. 22, 2017

(51) Int. Cl.
| | | |
|---|---|---|
| *A01K 13/00* | (2006.01) | |
| *A01K 29/00* | (2006.01) | |
| *A45D 24/04* | (2006.01) | |
| *A45D 24/00* | (2006.01) | |

(52) U.S. Cl.
CPC .................... *A01K 13/002* (2013.01)

(58) Field of Classification Search
USPC ....... 119/632, 600, 625, 611, 618, 633, 628, 119/631, 629, 664, 612, 615; D30/158, D30/159; 132/119, 219, 126, 137, 141, 132/142, 161, 158, 120, 154; 15/169, 15/142, 186–188, DIG. 5, 110, 111, 291; D4/136, 130, 132, 134, 117, 119
See application file for complete search history.

(56) References Cited

U.S. PATENT DOCUMENTS

| | | | | |
|---|---|---|---|---|
| 997 | A | | 11/1838 | Sanford |
| 186,652 | A * | 1/1877 | White | ........... A01K 13/002 119/631 |
| 202,410 | A * | 4/1878 | Cole | ..................... 119/612 |
| 248,817 | A * | 10/1881 | Weaver | ................. 119/612 |
| 250,349 | A * | 12/1881 | Dole | ..................... 119/612 |
| 430,077 | A | | 6/1890 | Jenness |
| 578,223 | A | | 3/1897 | Elving |
| 591,273 | A * | 10/1897 | Griffey | ................. 119/612 |

(Continued)

FOREIGN PATENT DOCUMENTS

| | | | |
|---|---|---|---|
| DE | 19696952 A1 * | 2/1996 | ............. A45D 40/26 |
| DE | 19606052 A1 * | 8/1997 | ............. A45D 24/10 |

(Continued)

OTHER PUBLICATIONS

Web page from www.petsmart.com for CHI Long Hair Slicker & Shedding Rake Combo product, Dec. 14, 2015 (1 page attached).

(Continued)

*Primary Examiner* — Andrea Valenti

(74) *Attorney, Agent, or Firm* — Sunstein Kann Murphy & Timbers LLP

(57) ABSTRACT

An implement for grooming hair of an animal has a comb support and an array of tines mounted in the comb support. The array has a plurality of generally parallel combs, and each comb has a set of regularly spaced generally parallel tines of similar size. In one aspect, the spacing between adjacent tines of a selected comb varies depending on the location of the comb along a longitudinal axis. In this aspect, as the comb support is drawn to effectuate the grooming of the hair of the animal, hair at the selected location experiences a progression in at least three stages from coarse to more finely spaced tines.

23 Claims, 20 Drawing Sheets

(56) References Cited

U.S. PATENT DOCUMENTS

| | | | | |
|---|---|---|---|---|
| 648,845 | A * | 5/1900 | Laflin | A41D 17/00 36/2 R |
| 670,254 | A | 3/1901 | Slater, Sr. | |
| 717,377 | A | 12/1902 | Flanders | |
| 749,596 | A * | 1/1904 | Webb | A01K 13/002 119/628 |
| 930,678 | A | 8/1909 | Moore | |
| 1,012,653 | A * | 12/1911 | Knickerbocker | A46B 11/0013 15/188 |
| 1,025,793 | A * | 5/1912 | Endsley | 119/612 |
| 1,031,485 | A * | 7/1912 | Stroup | 132/120 |
| 1,058,705 | A | 4/1913 | Guettinger | |
| 1,135,645 | A * | 4/1915 | Woodall | 119/612 |
| 1,142,698 | A | 6/1915 | Grove et al. | |
| 1,172,544 | A * | 2/1916 | Metzner | A46B 7/00 132/120 |
| 1,280,204 | A * | 10/1918 | Garber | A01K 13/002 119/629 |
| 1,303,500 | A | 5/1919 | Rosenberg | |
| 1,326,782 | A * | 12/1919 | Printz | A01K 13/002 119/631 |
| 1,386,344 | A * | 8/1921 | Lund | A46B 15/00 132/120 |
| 1,401,134 | A * | 12/1921 | Butterfield | A01K 13/002 119/612 |
| 1,644,208 | A * | 10/1927 | Stephens, Jr. | A45D 24/16 132/120 |
| 1,689,209 | A | 8/1928 | Majewski | |
| 1,711,486 | A * | 5/1929 | Bushman | A46B 15/00 132/142 |
| 2,043,758 | A * | 6/1936 | Lay | A46B 9/06 15/159.1 |
| 2,205,200 | A | 6/1940 | Huppert | |
| 2,238,603 | A | 4/1941 | Runnels | |
| 2,383,967 | A | 9/1945 | Hernon | |
| 2,529,927 | A | 11/1950 | Fisk | |
| 2,781,739 | A * | 2/1957 | Talbert | A01K 13/002 119/628 |
| 2,879,777 | A | 3/1959 | Miller | |
| 2,881,460 | A * | 4/1959 | Baudouin | A46B 7/023 15/184 |
| 3,059,260 | A | 8/1962 | Peilet | |
| D194,731 | S * | 2/1963 | Dent | D28/25 |
| 3,107,665 | A | 10/1963 | Nordgren | 128/60 |
| 3,133,546 | A | 5/1964 | Dent | |
| 3,172,139 | A | 3/1965 | Wire | |
| D237,225 | S * | 10/1975 | Kahn | D4/136 |
| 4,226,251 | A | 8/1980 | Wall | |
| D260,949 | S * | 9/1981 | Megna | 15/187 |
| D264,275 | S * | 5/1982 | Megna | 15/187 |
| 4,412,365 | A * | 11/1983 | Schmitt | A46B 7/023 132/121 |
| 4,730,361 | A * | 3/1988 | Koffler | A46B 9/023 132/120 |
| D317,083 | S | 5/1991 | Chou | |
| 5,267,528 | A | 12/1993 | Murieen, Sr. | |
| 5,603,137 | A * | 2/1997 | Hasan | A46B 7/04 119/628 |
| 5,862,780 | A | 1/1999 | Landreneau | |
| 5,922,139 | A * | 7/1999 | Gilbert | A47G 27/0487 134/6 |
| 5,926,902 | A * | 7/1999 | Pierre | A45D 24/42 119/628 |
| 6,082,307 | A | 7/2000 | Landreneau | |
| 6,427,633 | B1 | 8/2002 | Ogden | |
| D468,541 | S * | 1/2003 | Holmes | D4/136 |
| 6,510,816 | B2 * | 1/2003 | Ehrmann | A01K 13/002 119/601 |
| 6,595,219 | B2 * | 7/2003 | Anderson | A46B 9/10 132/123 |
| D490,194 | S * | 5/2004 | Plante | D30/159 |
| D513,349 | S * | 12/2005 | Hammer | D30/158 |
| 7,077,076 | B2 | 7/2006 | Porter et al. | |
| 7,222,588 | B2 | 5/2007 | Porter et al. | |
| 7,334,540 | B2 | 2/2008 | Porter et al. | |
| 7,353,777 | B2 | 4/2008 | Morosin et al. | |
| D584,863 | S * | 1/2009 | Garry | D30/158 |
| 7,509,926 | B2 | 3/2009 | Porter et al. | |
| 7,650,857 | B2 | 1/2010 | Porter et al. | |
| 7,650,858 | B2 | 1/2010 | Porter et al. | |
| 7,717,067 | B2 | 5/2010 | Porter et al. | |
| D616,651 | S | 6/2010 | Lin | |
| 7,739,769 | B2 | 6/2010 | DiPippo | |
| D627,565 | S | 11/2010 | Tyce et al. | |
| 7,908,700 | B2 | 3/2011 | DiPippo | |
| 8,082,887 | B2 * | 12/2011 | Fernandez | A01K 13/002 119/612 |
| 8,127,773 | B2 * | 3/2012 | DiPippo | A45D 24/42 119/628 |
| 8,181,304 | B1 * | 5/2012 | Kamath | A46B 9/023 132/120 |
| 8,342,188 | B2 | 1/2013 | Pabari et al. | |
| 8,857,005 | B2 * | 10/2014 | Shim | A46B 15/00 132/119 |
| D749,326 | S * | 2/2016 | Rennette | D4/121 |
| 2001/0037772 | A1 | 11/2001 | Huddleston | |
| 2005/0150465 | A1 | 7/2005 | Dunn et al. | 119/601 |
| 2006/0000423 | A1 | 1/2006 | Morosin et al. | |
| 2006/0249094 | A1 | 11/2006 | Hellyer | |
| 2007/0033758 | A1 * | 2/2007 | Wang | A46B 17/06 15/169 |
| 2012/0111282 | A1 * | 5/2012 | Dennis | A01K 13/002 119/601 |
| 2014/0158151 | A1 | 6/2014 | Sebagereka et al. | |
| 2017/0172105 | A1 | 6/2017 | Murrihy et al. | |

FOREIGN PATENT DOCUMENTS

| | | | |
|---|---|---|---|
| GB | 449580 | * | 3/1936 |
| GB | 539653 A | | 9/1941 |
| GB | 794594 A | | 5/1958 |

OTHER PUBLICATIONS

International Searching Authority, International Search Report—International Application No. PCT/US16/66515, dated Apr. 20, 2017 together with the Written Opinion of the International Searching Authority, 11 pages.

* cited by examiner

SELF-CLEANING PET GROOMING IMPLEMENT

TECHNICAL FIELD

The present invention pertains to hand tools used to groom, and remove shed hair from, a pet's coat. In addition, the present invention also relates to such tools that self-clean to remove collected shed hair.

BACKGROUND OF THE INVENTION

There is a professional and consumer need for an ergonomic grooming implement for pets, which enables the user to both detangle and deshed a pet's coat. Currently, professional groomers and pet owners typically have to use a number of tools in order to groom effectively. For example, a pet will be first groomed with a rake, a long toothed coarse comb, to un-mat and detangle the pet's coat, and also remove undercoat on double coated animals. Subsequently, the pet is groomed with a short toothed fine comb, such as a brush or carding blade, to collect shed hair from the top of the coat. The goal of these processes is to remove shed hair, to prevent it from otherwise soiling the household, and to also improve the appearance and sheen of the pet's coat.

However, these processes, which are performed in series, consume a significant amount of the user's time. Furthermore, the current tools for these processes are of varying efficacy because pet coat types are diverse, and often, these tools only work for a sub-set of pet coat types, and not-at-all on others. For example, a short toothed carding blade is much less applicable for pets that have a long and winding coat type, as the blade does not groom through smoothly on such breeds, and will tug on the pet's coat causing discomfort.

Additionally, many tools found in the prior art give poor ergonomic consideration to such design characteristics as the placement of the handhold and arrangement of the comb tines. This has a detrimental effect on the ease with which the user may operate the tool and consequentially, its grooming effectiveness. For example, certain tools of the prior art couple a handle to end of, and parallel to, the rows of comb tines. Users of such tools must then move their arm laterally to groom, and apply significant torque through their wrist. In addition, users may also need to appreciably rotate their wrist during a grooming motion, to best utilize all the comb rows of the tool. These arduous wrist movements detract from the tool's grooming effectiveness.

Shed hair is collected in the tool as the pet's coat is groomed. However, as the tool fills with shed hair, the performance of the tool to further collect shed hair diminishes. To continue using the tool effectively therefore, users must also frequently clean the tools, often by hand, which further consumes a significant amount of their time.

Where self-cleaning features are included in tools found in the prior art, they are often bulky and of limited efficacy. They typically comprise movable plates, where the comb tines are located in slotted holes, and are activated by a thumb button to move the plate forward to clean the tool. Given tools with self-cleaning features found in the prior art are typically driven by a thumb press, such self-cleaning tools are limited to relatively short tines.

SUMMARY OF THE EMBODIMENTS

The invention both addresses, and significantly surpasses, the limitations of the prior art aforementioned. The invention provides a means to both detangle and deshed a pet's coat using a single grooming implement. The implement comprises a series of modulated comb types and modulated row spacing, from coarse to fine, thus enabling users to perform the task of grooming a pet's coat in considerably less time than using separate coarse tools and fine tools in succession. Moreover, the implement is more effective than the prior art given that it can be used on pets of all coat types. In the aforementioned approach to grooming using current tools, there is a single step change from coarse to fine grooming, which can cause discomfort to pets as the fine tool pulls on their coat. The modulated array of comb tines in the implement results in a more comfortable grooming experience, for both the user and pet, since there is a progressive change from a coarse to fine comb array.

When holding the implement, the user places it on the pet's coat, first putting a coarse comb on the pet at a selected location. In a single grooming motion, the user will then draw the implement such that a second comb having tines with a second spacing, smaller than the first spacing, reaches the selected location. Subsequently, as a grooming motion continues, progressively finer combs groom through the coat, so that the pet's hair at the selected location experiences a progression from coarse to fine combs. After considerable testing, the inventors discovered that there are significant benefits in orienting the rows of combs transversely to the principle longitudinal axis of the handhold. In particular, the ergonomic position of the handhold relative to the comb tine array facilitates more effective grooming, by minimizing the torque on the user's wrist during a grooming motion.

The transverse arrangement of the handhold, relative to the comb tine array, was selected following numerous iterations to discover its advantages; that negligible torque is applied to the wrist during the grooming motion, and a pull type of motion is most comfortable for the user while grooming a pet's coat. A slight ulnar deviation of the user's wrist is also required, to rotate the face of the implement, such that the finer portion of the comb tine array passes through the coat during a single grooming motion. Hence, the implement has a curved profile, by selection of an appropriate curve to align the comb tine tips to, so that the rotation of the user's wrist is minimized.

The implement may include a self-cleaning mechanism, whereby shed hair collected on the combs can be removed when it is actuated by the user. This feature operates instantaneously, and thus substantially reduces the time required of the user to clean the implement. As the user pulls a knob on the implement to power the mechanism, their input actuation is amplified to reduce the stroke required to work it, such that the implement is ergonomic. Cross-bars which are parallel to, and between the rows of combs, move forward from the base of the implement as the mechanism protracts to self-clean. Given the user's input is amplified, the mechanism can be comfortably driven by a small motion to clean the whole comb array, including the region where the tines are long. In the prior art however, where a self-cleaning feature is provided, the cleaning stroke is only equal to, and thus limited to, the input motion applied by the user. Hence, cleaning features of the prior art, are only found in short toothed tools.

Furthermore, the cleaning cross-bars and spine sub-assembly of the implement are of a minimal form-factor compared to the typically bulky arrangements found in the prior art, such that it is lightweight and in accordance with the ergonomic design of the implement.

The invention is exemplified herein by eleven embodiments, although numerous variations, modifications and combinations of the embodiments are possible within the scope of this disclosure.

The first embodiment depicts a self-cleaning grooming implement intended for use on large pets with long haired coats. The coats of pets with long hair have the propensity to tangle and mat, and thus grooming such coats requires both a detangling and deshedding process. The first embodiment comprises an implement with a series of combs of non-uniform tine length, tine spacing and row spacing. A handle is coupled to the base of the comb array support body, defining a principal longitudinal axis, to which the rows of combs are transversely disposed. As the user performs a grooming motion with the implement, the pet's coat is first penetrated at a selected location with long coarse comb tines with a corresponding coarse row spacing, nearest to the handle, to first detangle the coat. As a grooming motion continues, wherein the implement is drawn past the selected location, the combs progressively become shorter in length, and both the tine spacing and row spacing become finer to collect shed hair throughout the pet's coat. Furthermore, the tips of the combs tines are ergonomically aligned to a curved surface, so as to minimize the amount of wrist rotation required of the user during grooming. In addition, the face of the implement has a tapered shape, such that constrained areas of a pet's coat can be ergonomically groomed using the narrow portion of the implement.

In this embodiment, the first two rows of coarse combs use large diameter tines to ensure that the implement is durable. These first rows of tines are the longest in the implement, and thus have the greatest cantilever from the main body. Providing large diameter tines ensures they have sufficient strength to resist permanent deformation due to the force undergone in detangling the pet's coat, and to also withstand accidental damage. Small diameter tines are used in the remainder of the array to collect shed hair from the pet's coat. Given the high forces the comb tines are subjected to during use, in this embodiment they are made from a high strength wrought aluminum alloy. A specific example of such an alloy is 7075-T6, commonly used in the aerospace industry as it has a high yield and shear strength, yet is lightweight compared to other metal alloys, such as steels, which have similar mechanical properties.

The first embodiment also includes a comb self-cleaning mechanism that enables the user to operate a knob to activate the feature, and rapidly remove shed hair collected in the implement. When operated, the self-cleaning mechanism advances cross-bars in the comb row interstices away from the main body, to force collected shed hair out of the comb tine array. The mechanism makes use of a scissor like pantograph, to amplify the user's input actuating stroke, to output a greater forward stroke of the cross-bar sub-assembly, to self-clean the whole comb array, including the region where there are long tine lengths. Moreover, the central spine and perpendicular cross-bar sub-assembly, which cleans hair from the comb array interstices, has a minimal form factor and is much lighter than the plates with slotted holes in them, as used in the prior art.

The second embodiment is similar to the first, in that the size of the implement, comb tine array and self-cleaning feature are same. However, this second embodiment illustrates an alternative means by which to construct the modulated array of comb tines, whereby an identical array may be created by the use of comb plates with numerous tines in every piece, instead of discrete tines, as exhibited in the first embodiment. In order for the implement to be strong and durable, yet lightweight and ergonomic, the comb plates of this embodiment may similarly be made from the high strength wrought aluminum alloy 7075-T6, as used for the discrete tines in the first embodiment.

The third embodiment exhibits the same design fundamentals and ergonomic considerations as the aforementioned embodiments. This embodiment however, portrays an implement intended for use on small pets with long haired coats. The third embodiment comprises a reduced array of comb tines, since small pets have less coat surface area to groom. The comb tine array of this embodiment consists of a coarse section, with strong large diameter tines, which first detangles the coat in a grooming motion, since long hair has a propensity to knot. As the embodiment is drawn through the pet's coat, the comb array progressively becomes finer, to collect shed hair from the coat. In addition, the third embodiment illustrates an alternative whereby a tapered compression return spring is used to result in a more compact self-cleaning mechanism sub-assembly, compared to that presented in the first embodiment.

A fourth embodiment presents an alternative wherein the handle is omitted in lieu of a hand strap affixed to the rear of the implement body, defining the same longitudinal axis as described by the handles of the foregoing embodiments. This embodiment encompasses the same innovative grooming concepts as described by the first embodiment, yet in a more compact form factor.

The fifth embodiment describes yet a further alternative with respect to the manner in which the implement may be held by the user. In this variation of the first embodiment, an inverted handle is coupled to the rear of the comb array support body, where again, the handle length defines the same longitudinal axis as in the aforesaid embodiments.

A sixth embodiment exemplifies an alteration to the first embodiment, wherein the self-cleaning mechanism has been omitted. This embodiment is intended to offer the owners of large pets with long haired coats a lower priced product, since they must clean shed hair collected in the implement by hand. A central cleft region in the comb array, which is devoid of tines and oriented along the longitudinal axis of the implement, allows the user to easily pinch the mass of shed hair collected, and remove it.

The seventh embodiment is principally similar to the sixth embodiment, where this embodiment is designed for use on small pets with long haired coats.

An eighth embodiment represents a self-cleaning grooming implement envisioned for use on large pets with short haired coats. This embodiment comprises a series of closely spaced rows of combs of uniform tine length, and the tines in each row are closely spaced together. Pets with short hair have thin coats that do not require long stocky tines to be penetrated, and the coats of such pets do not generally tangle. Thus, the eighth embodiment differs from the preceding embodiments, in that the comb array excludes the coarse stocky tined detangling portion of the comb array, and includes only slender comb tines of a uniform short length. Essentially, the comb array of the eighth embodiment is a dense arrangement of short tines, made from a high strength wrought aluminum alloy, such as 7075-T6, and designed to gather fine shed hair. Furthermore, the position of the tine tips are staggered row by row, to not provide a clear path for hair to pass through the comb array during grooming, and maximize the efficiency with which shed hair is collected.

The handle of the eighth embodiment is coupled to the comb array support body, and describes the longitudinal axis, to which the rows of combs in the array are transversely disposed. Such an arrangement, alike the foregoing embodiments, enables the user to groom effectively and ergonomically by pulling the implement towards them. Additionally, the tips of the comb tines are aligned to a curved profile, thereby reducing the amount of wrist rotation required whilst grooming. Finally, as in the preceding embodiments, the tapered shape of the face of the implement allows the user to groom constrained areas of the pet's coat using the narrower portion of the comb array.

The ninth embodiment is principally the same as the eighth embodiment, but without the self-cleaning mechanism. This embodiment is envisaged to be a lower priced version of the eighth embodiment, since users are required to clean shed hair collected in the implement manually. The region otherwise occupied by the self-cleaning mechanism forms a cleft, devoid of tines, that divides the array of combs into two parts. In a typical configuration, the cleft is about the width of a human finger. The central gap provided by the cleft region in the comb array, oriented along the longitudinal axis described by the handle, permits the user to pinch the collected hair with their thumb and index finger to remove it.

A tenth embodiment presents a self-cleaning grooming implement devised for grooming small pets with short haired coats. This embodiment follows the same design and ergonomic rules as disclosed by the eighth embodiment. Since small pets have less coat surface area to groom however, the tenth embodiment has an abridged array of comb tines.

Finally, the eleventh embodiment is an amended version of the tenth embodiment, wherein the self-cleaning mechanism has been excluded. This eleventh embodiment provides a lower priced implement for grooming small pets with short haired coats, since collected shed hair must be cleaned by hand.

BRIEF DESCRIPTION OF THE DRAWINGS

The foregoing features of the embodiments presented will be more readily understood by reference to the following detailed description, taken with reference to the accompanying drawings.

The following figures serve to illustrate the fundamentals of the modulated array of comb tines and the integral self-cleaning mechanism, exemplified in depth by the first embodiment. The following figures describe the first embodiment:

FIG. 6 shows the alignment of the comb tine tips to a curve in profile, to facilitate the ergonomic use of the implement.

Figure 11:
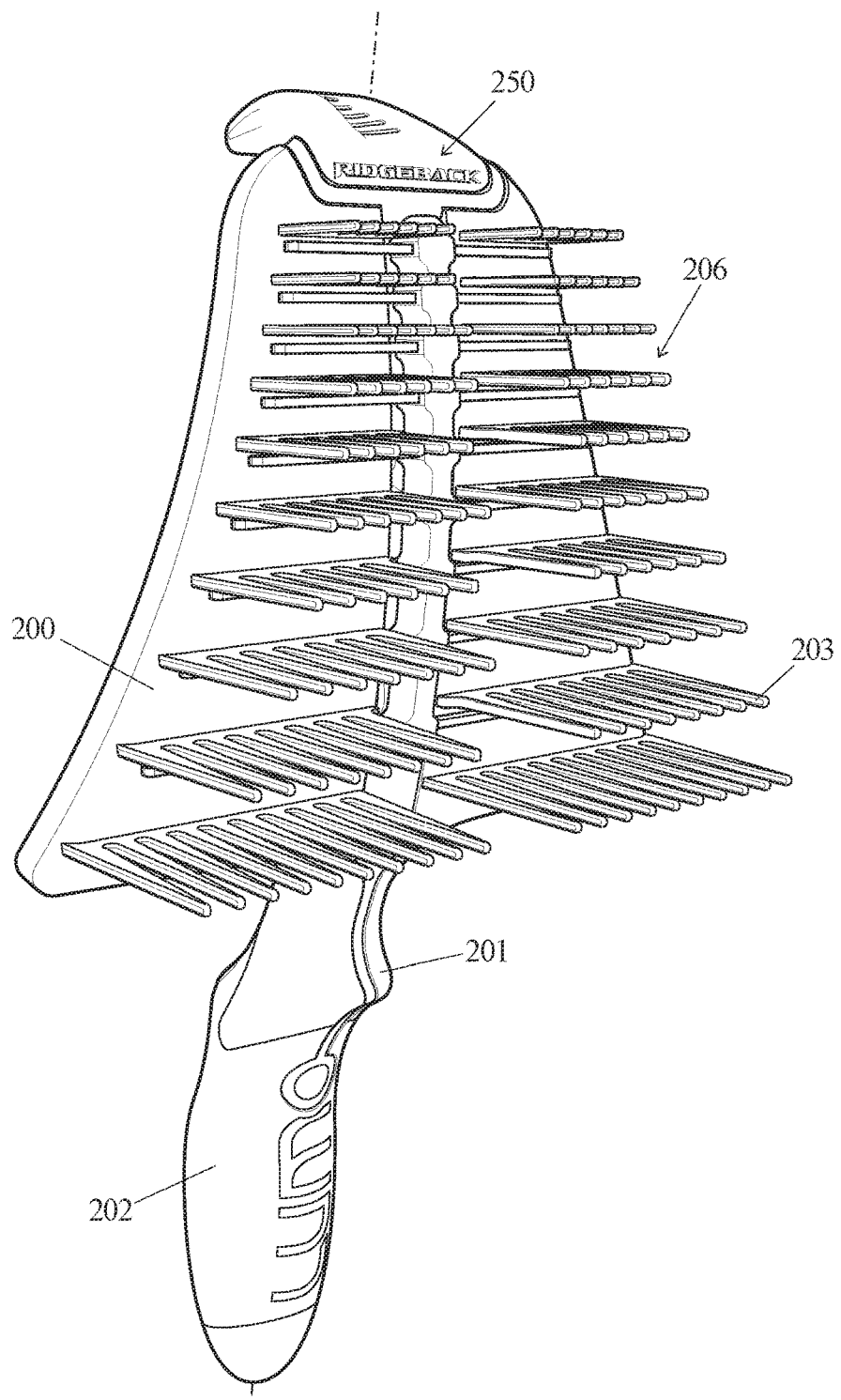

The second embodiment is much the same as the first embodiment, except that it illustrates an alternative to use comb plates instead of discrete tines to form an equivalent tine array. The following figure represents the second embodiment:

FIG. 11 is an oblique front perspective view, illustrating an alternative where comb plates are used in lieu of individual tines to form the modulated array.

Figure 12:
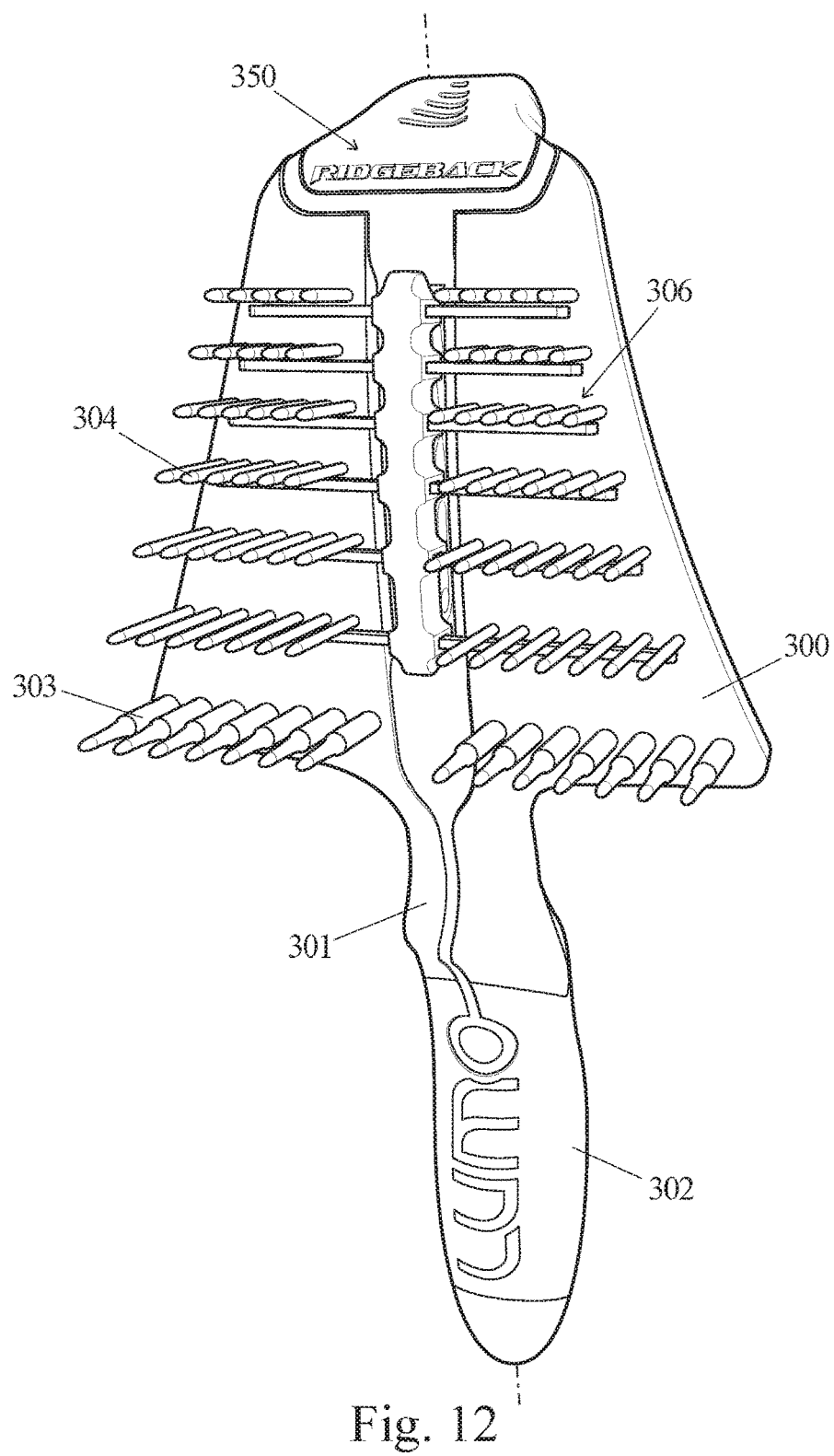

The third embodiment is similar to the first, and is a reduced implement for use on small pets with long haired coats. This embodiment however, includes a more compact self-cleaning mechanism sub-assembly, by means of a tapered compression return spring. The third embodiment is elucidated in the following figures:

FIG. 12 is an oblique front perspective view, illustrating an alternative with a smaller sized comb tine array for use on small pets with long haired coats.

Figure 13A:
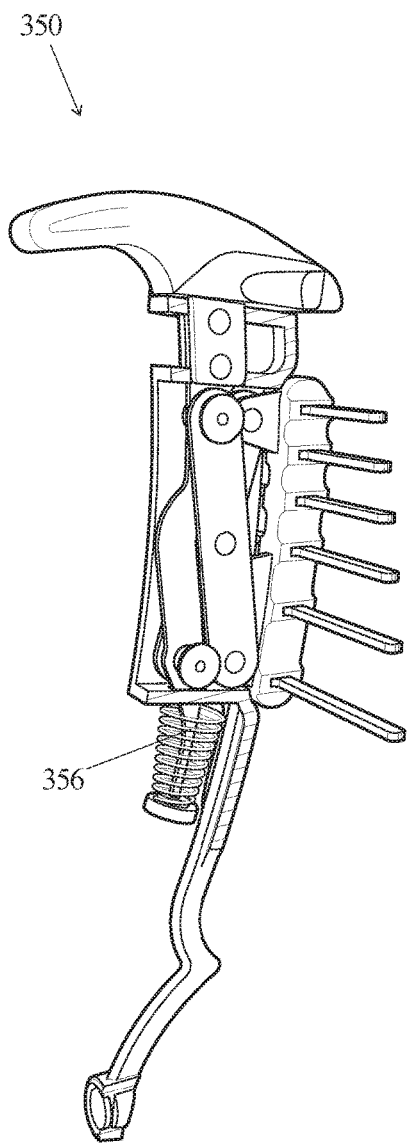

FIG. 13A is a sectional view of the self-cleaning mechanism sub-assembly, in the at rest position, which illustrates the alternative to use a tapered compression return spring to make the sub-assembly more compact.

Figure 13B:
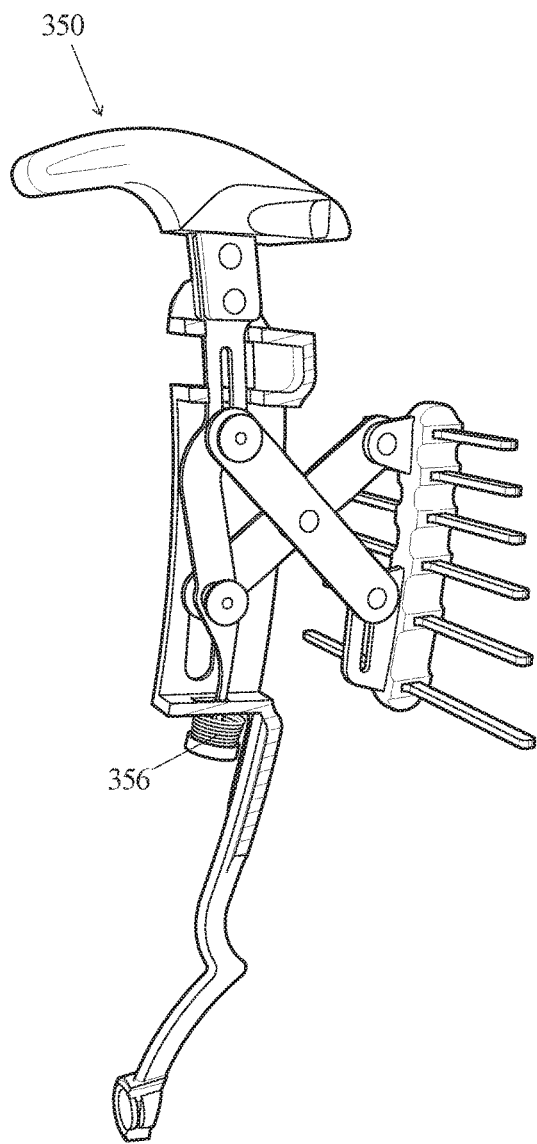

FIG. 13B is a sectional view of the self-cleaning mechanism sub-assembly, in the final actuated position.

Figures 14A, 14B:
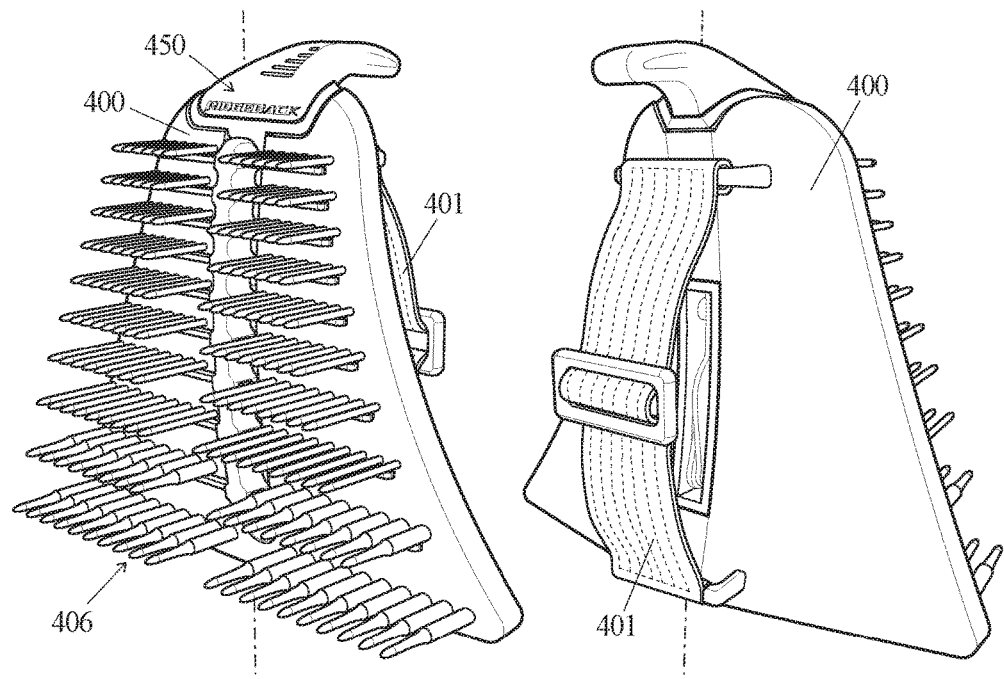

The fourth embodiment is an alternative to the first, wherein an adjustable hand strap is affixed to the rear of the implement body. The following figures depict the fourth embodiment:

FIG. 14A is an oblique front perspective view, illustrating an alternative where the handle is omitted in lieu of a hand strap affixed to the rear of the implement body.

FIG. 14B is an oblique rear perspective view, showing the adjustable hand strap affixed to the rear of the implement body.

Figure 14C:
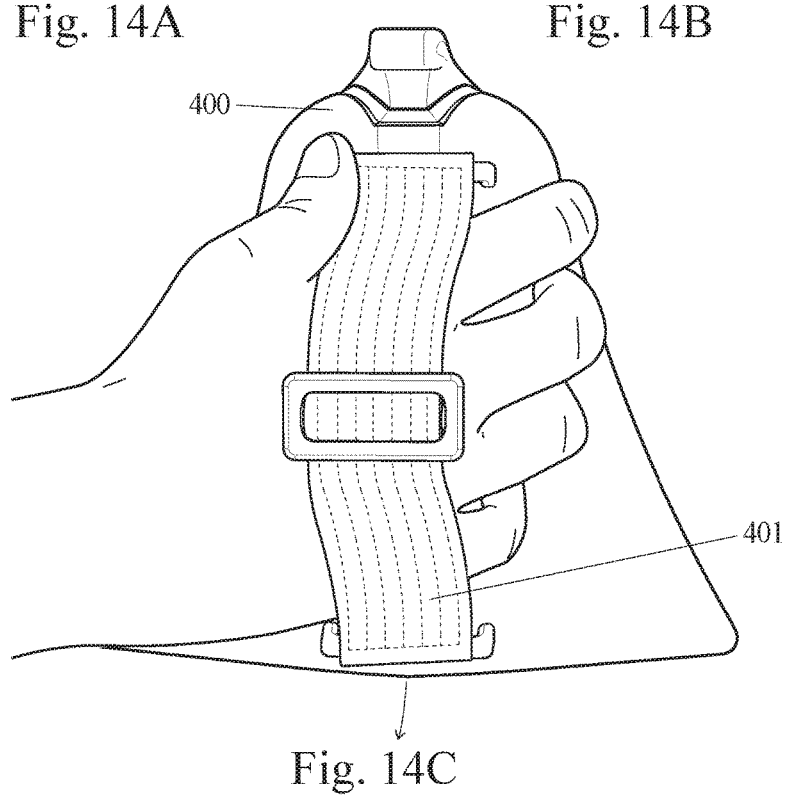

FIG. 14C is a rear perspective view, indicating the intended manner in which the fourth embodiment is to be held by the user.

Figures 15A, 15B:
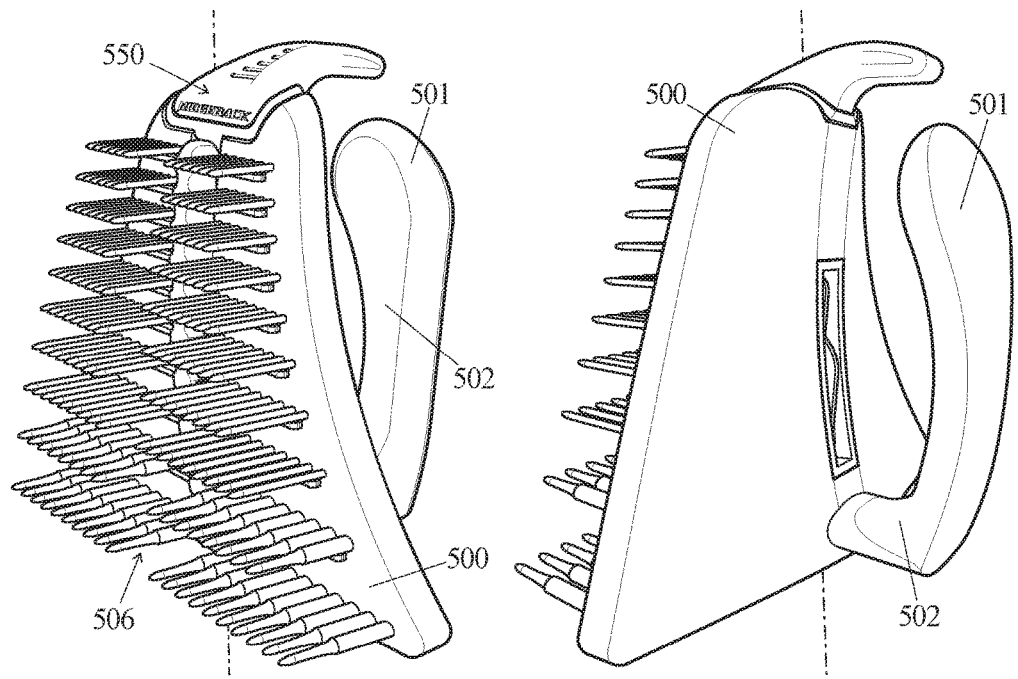

The fifth embodiment illustrates a further alternative to the first, coupling an inverted handle to the rear of the comb array support body. The fifth embodiment is exhibited in the following figures:

FIG. 15A is an oblique front perspective view, illustrating an alternative where an inverted handle is affixed to the rear of the implement body.

FIG. 15B is an oblique rear perspective view, showing the inverted handle affixed to the rear of the implement body.

Figure 15C:
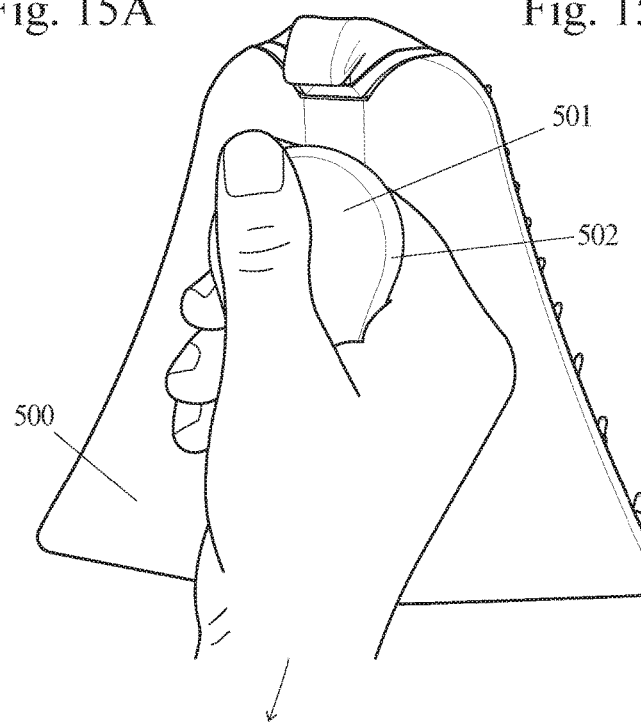

FIG. 15C is a rear perspective view, indicating the intended manner in which the fifth embodiment is to be held by the user.

Figure 16A:
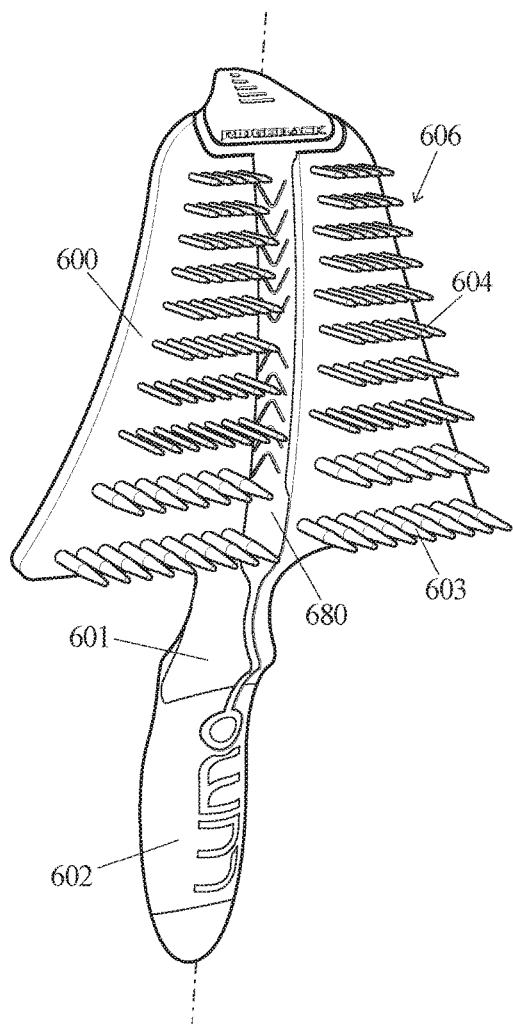

The sixth embodiment is modified version of the first embodiment, where the self-cleaning mechanism has been omitted. The sixth embodiment is presented in the following figures:

FIG. 16A is an oblique front perspective view of an implement for large pets with long haired coats, where a vertical cleft region, devoid of tines, is provided in the comb array to enable collected shed hair to be removed by a pinching action.

Figure 16B:
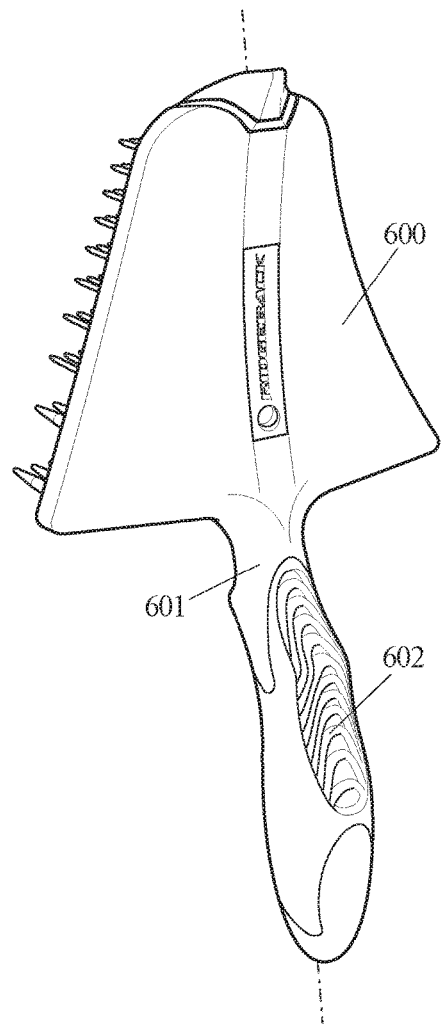

FIG. 16B is an oblique rear perspective view of the sixth embodiment.

Figure 17A:
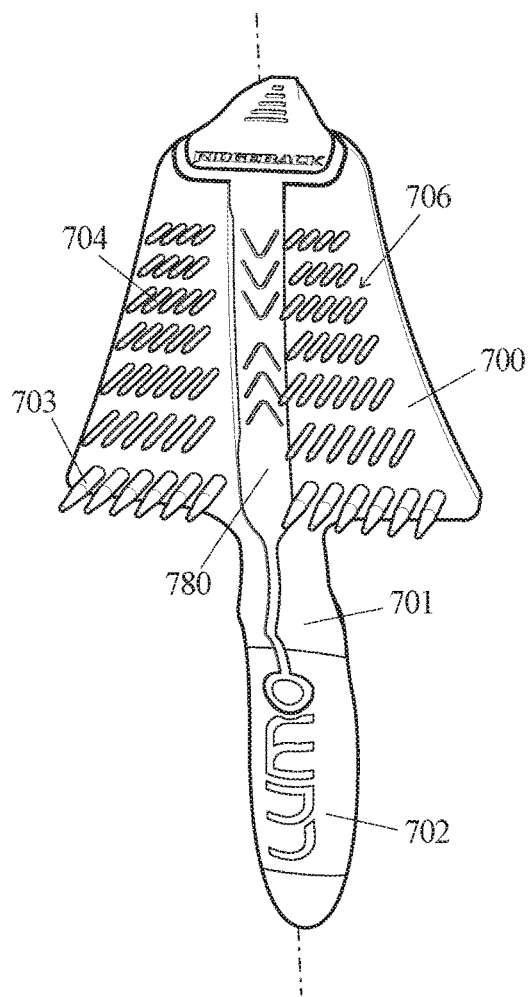

The seventh embodiment is similar to the third, and is a reduced implement for use on small pets with long haired coats. This embodiment excludes the self-cleaning mechanism and is designed to be cleaned by hand. The seventh embodiment is elucidated in the following figures:

FIG. 17A is an oblique front perspective view of an implement for small pets with long haired coats, which is cleaned by hand by pinching shed hair collected in the comb array to remove it.

Figure 17B:
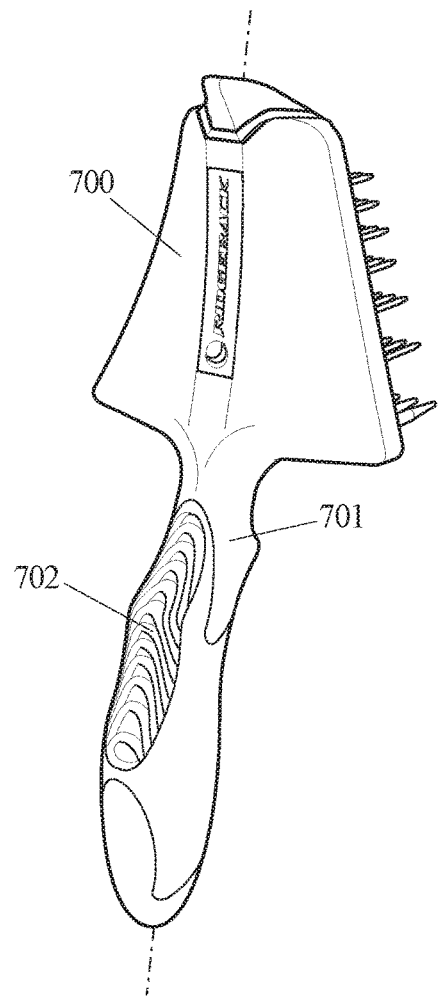

FIG. 17B is an oblique rear perspective view of the seventh embodiment.

Figure 18A:
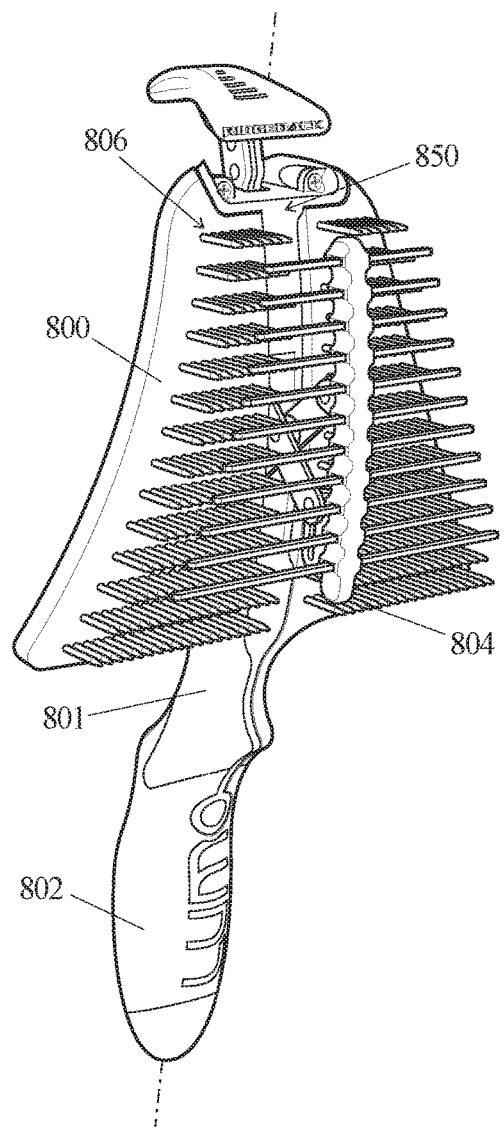

The eighth embodiment differs from all the foregoing embodiments, in that it is designed for pets with short haired coat types. The eighth embodiment is depicted in the following figures:

FIG. 18A is an oblique front perspective view of an implement for large pets with short haired coats, where it comprises a dense arrangement of slender, short tines in the comb array. In this figure, the self-cleaning mechanism is shown in the final actuated position.

Figure 18B:
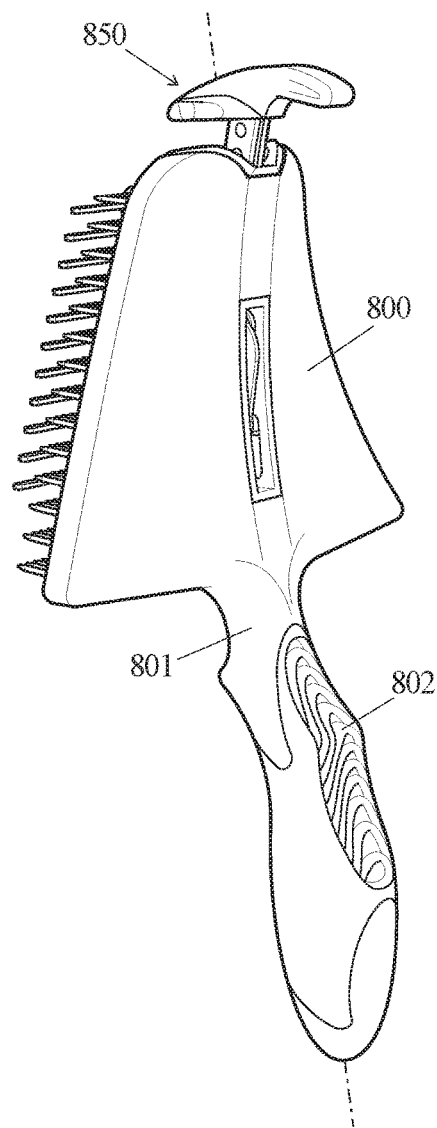

FIG. 18B is an oblique rear perspective view of the eighth embodiment.

Figures 19, 20:
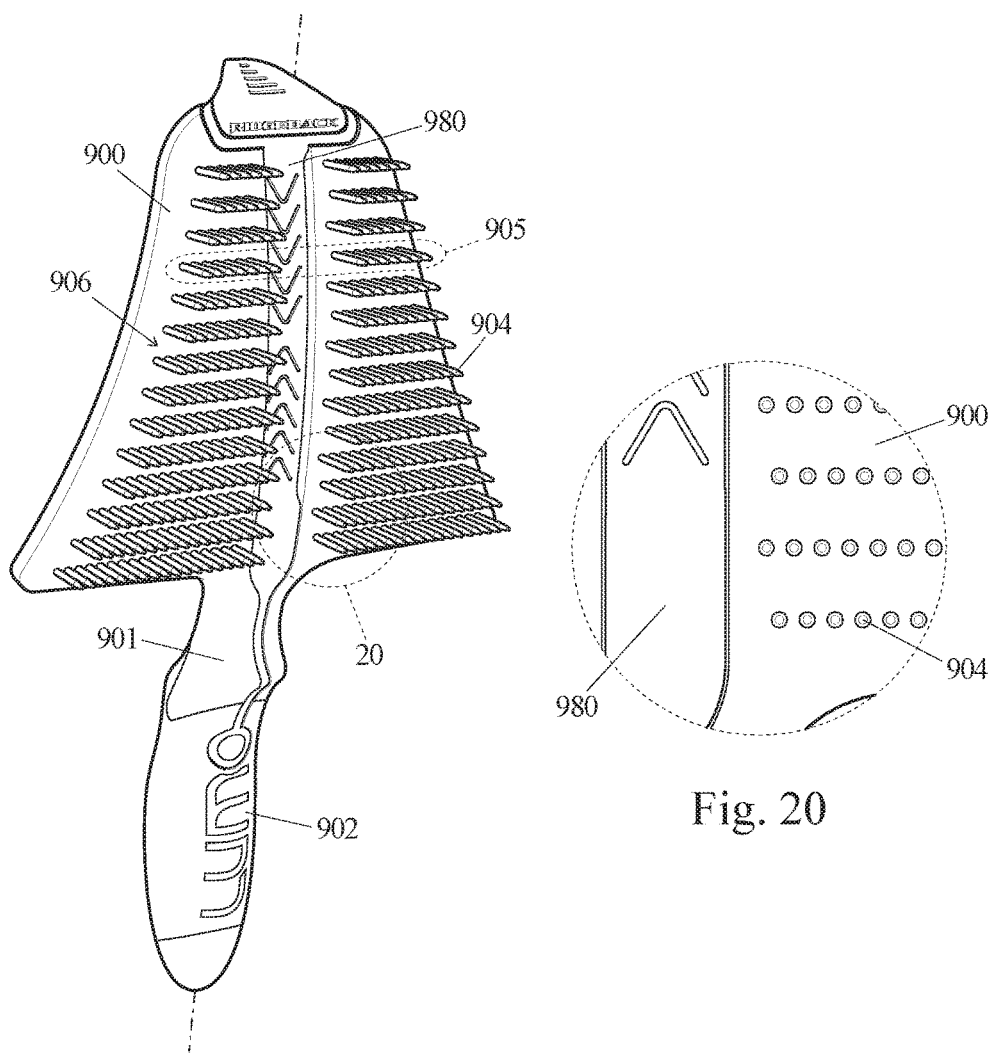

The ninth embodiment is modified version of the eighth embodiment, where the self-cleaning mechanism has been omitted to offer consumers a lower priced model, albeit must be cleaned by hand. The subsequent figures disclose the ninth embodiment:

FIG. 19 shows an oblique front perspective view of an implement intended for large pets with short haired coats. A vertical gap provided by the cleft region in the comb array to enables the users to clean shed hair from the implement by a pinching action.

FIG. 20 is an enlarged orthogonal front view of part of the comb tine array of the ninth embodiment, illustrating the dense arrangement of short comb tines, wherein the tines of all comb rows are closely spaced together, and designed to gather fine shed hair.

Figures 21, 22:
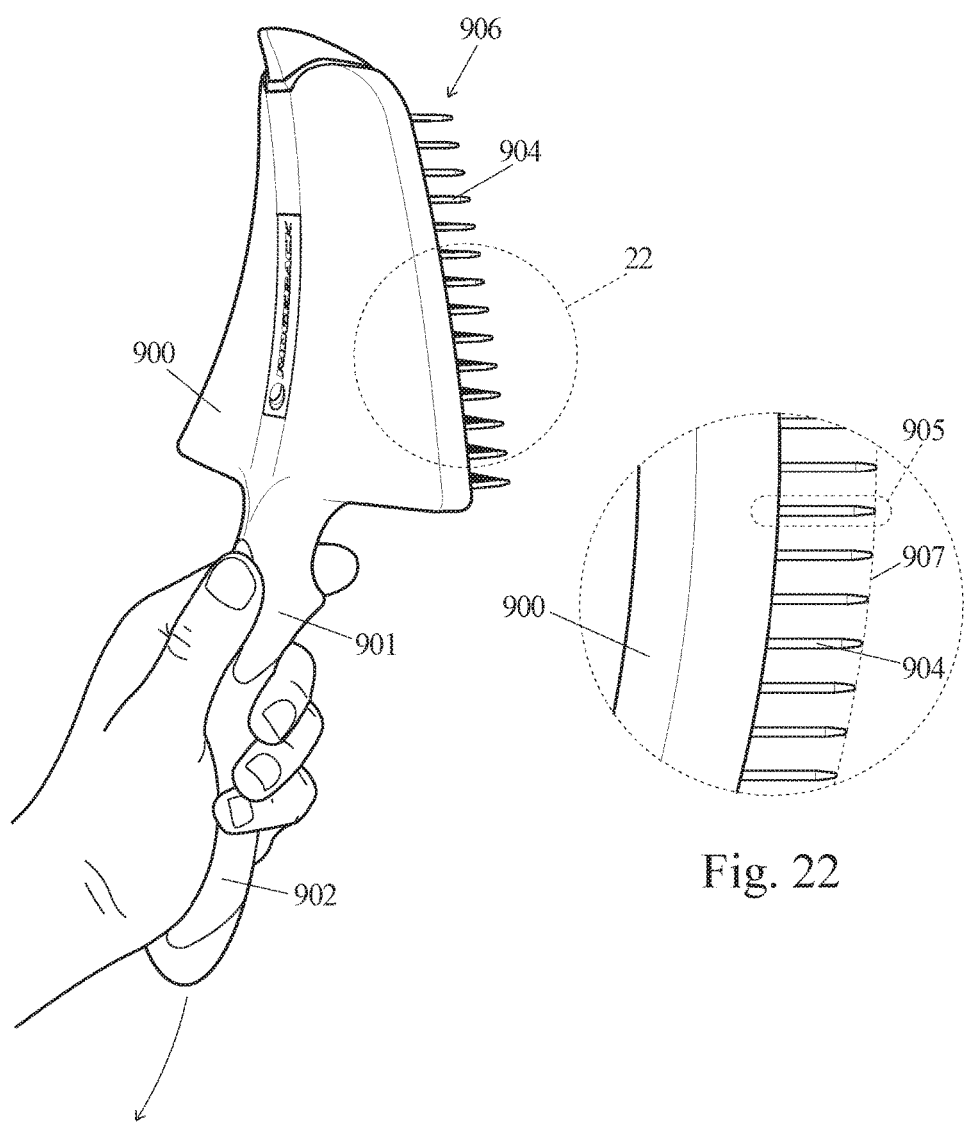

FIG. 21 is an oblique rear perspective view, indicating the intended manner in which the ninth embodiment is to be held by the user and the direction of grooming motion.

FIG. 22 is an enlarged orthogonal side view of part of the comb tine array, illustrating the uniform close spacing between rows of combs, wherein the tips of the tines are aligned to a curve, to facilitate the ergonomic use of the implement.

Figure 23A:
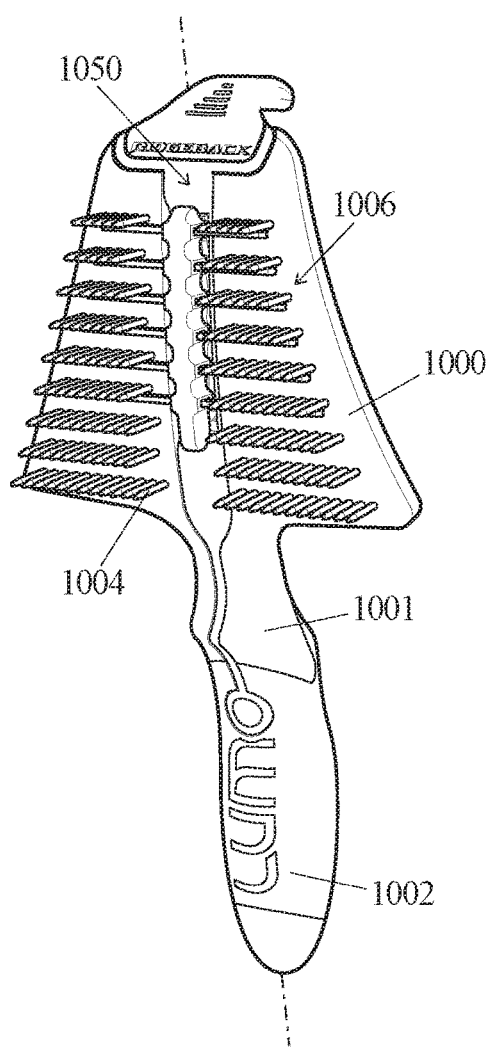

The tenth embodiment is a self-cleaning implement designed for grooming small pets with short haired coats. The tenth embodiment is elucidated in the following figures:

FIG. 23A is an oblique front perspective view of an implement for short haired small pets, where the reduced comb array comprises a dense arrangement of slender, short tines. In this figure, the self-cleaning mechanism is shown in the initial at rest position.

Figure 23B:
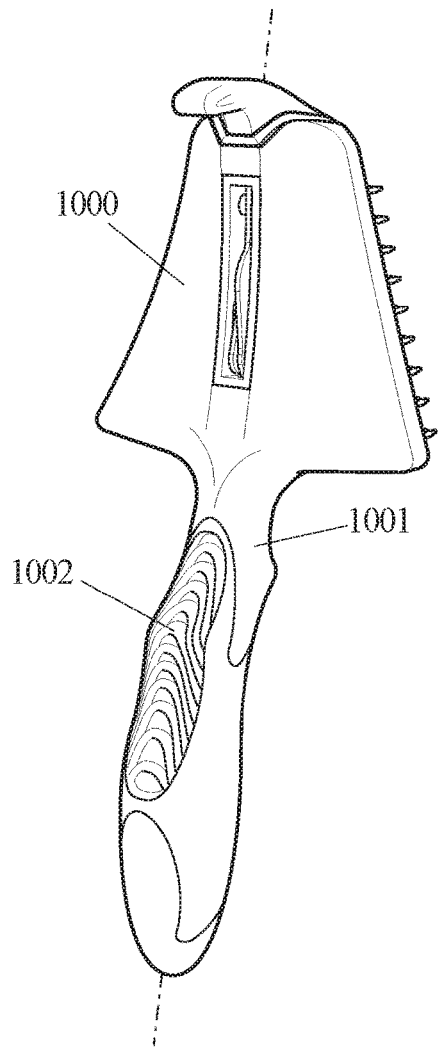

FIG. 23B is an oblique rear perspective view of the tenth embodiment.

Figure 24A:
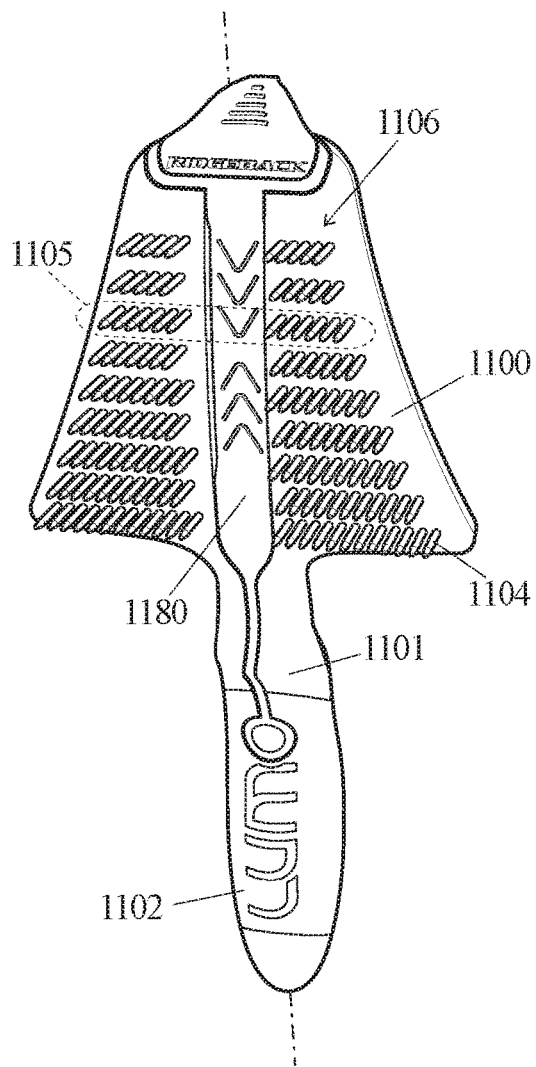

Finally, the eleventh embodiment is an implement envisaged for grooming small pets with short haired coats. The eleventh embodiment is comparable to the tenth embodiment, expect that the self-cleaning mechanism is excluded, and it is illustrated in the following figures:

FIG. 24A is an oblique front perspective view of an implement for short haired small pets, which is manually cleaned by pinching shed hair collected in the comb array to remove it.

Figure 24B:
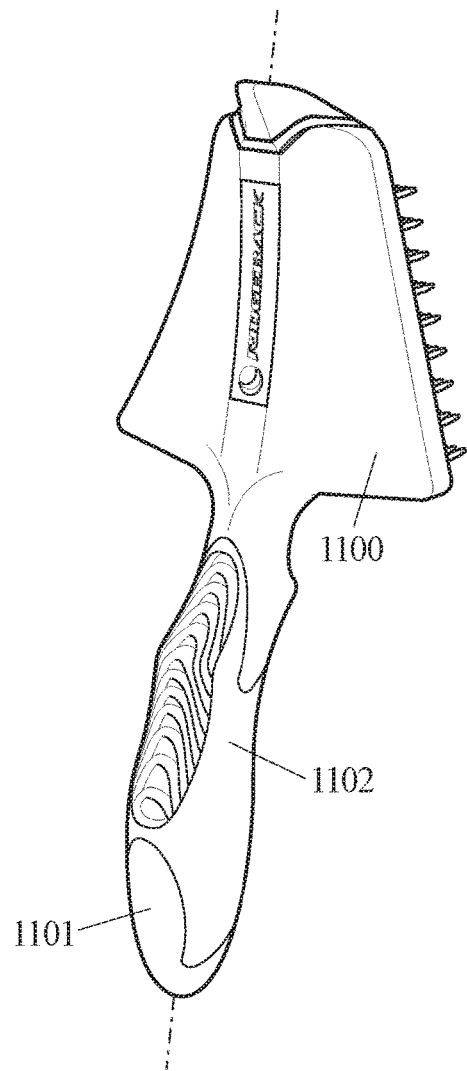

FIG. 24B is an oblique rear perspective view of the eleventh embodiment.

DETAILED DESCRIPTION OF THE EMBODIMENTS

The first embodiment exemplifies the modulated comb tine array principle, in an implement intended for use on large pets with long haired coats. Long hair has a tendency to entangle, and so pets with such coats require both a detangling and deshedding solution for their grooming. In a single grooming motion, the user will first penetrate the pet's coat with the long, coarse comb part of the array, and subsequently shorter, finer and more closely spaced rows of comb tines in the array will groom through, to simultaneously detangle and deshed the coat. This embodiment also includes a self-cleaning mechanism, such that shed hair collected in the implement can be rapidly removed.

Figure 1:
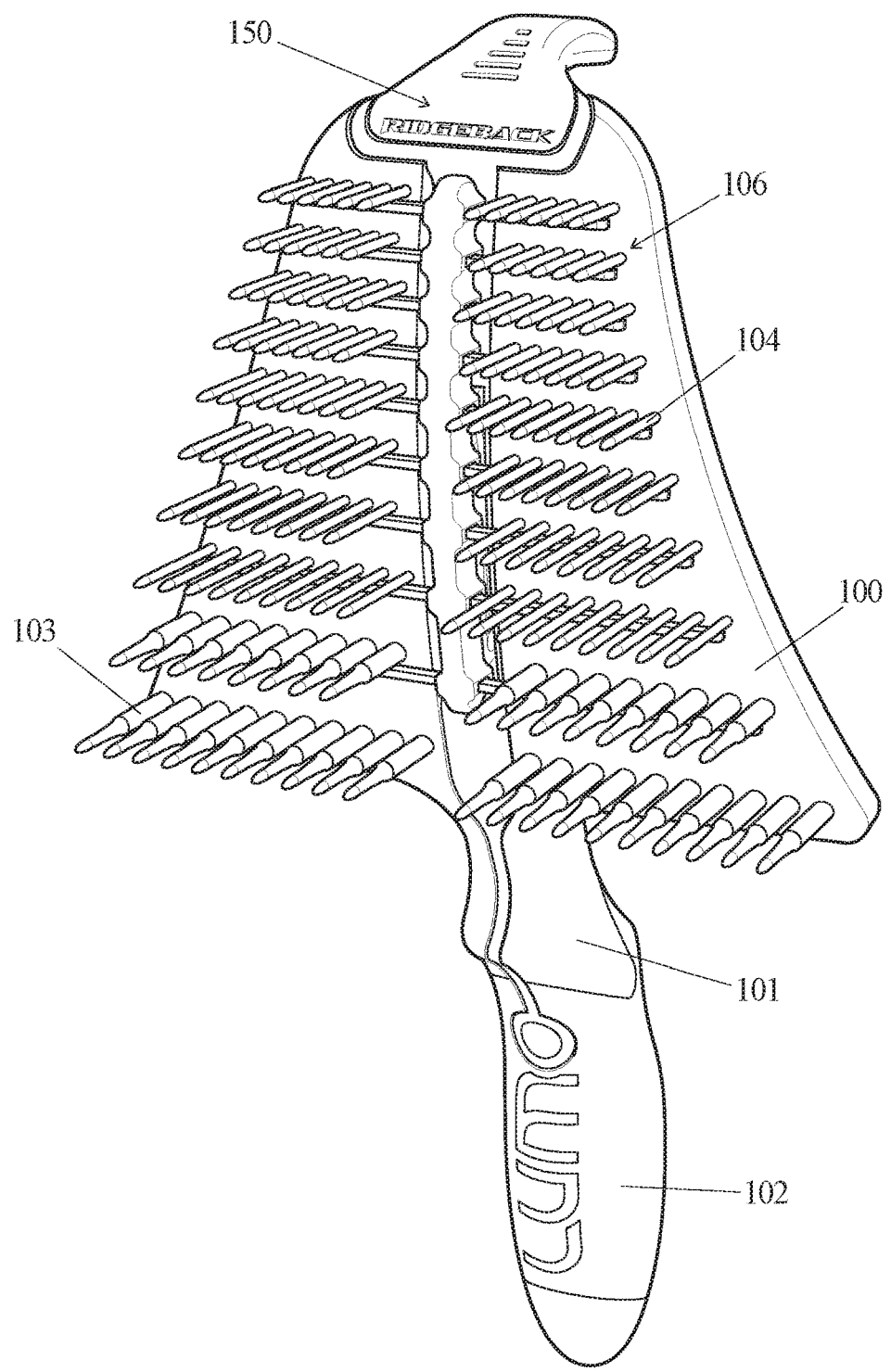
FIG. 1 is an oblique front perspective view of an implement intended for use on large pets with long haired coats, wherein a handle is coupled to the base of the comb array support body, and the self-cleaning mechanism is in the at rest position.

FIG. 1 shows an oblique front perspective view, of the first embodiment. This embodiment represents an implement of a size that would typically be used to groom large pets. The embodiment comprises a main body 100, to which a handle 101 is coupled, and supports a plurality of rows of generally parallel comb tines 103, 104, which may for example, have a circular cross section. A single row of comb tines 103, 104 constitute a comb 105, and the entire set of combs 105 in the implement form a comb array 106. The face of the implement and the comb array 106, as viewed in FIG. 3, has a tapered shape to facilitate ergonomic use, where it reduces in width from bottom to top so that the narrower part may be used to groom confined areas of a pet's coat, such as under limbs or around the snout. With respect to the view shown in FIG. 3, the bounding size of the first embodiment is 230 mm long, 115 mm wide and 80 mm deep.

Figures 3, 4:
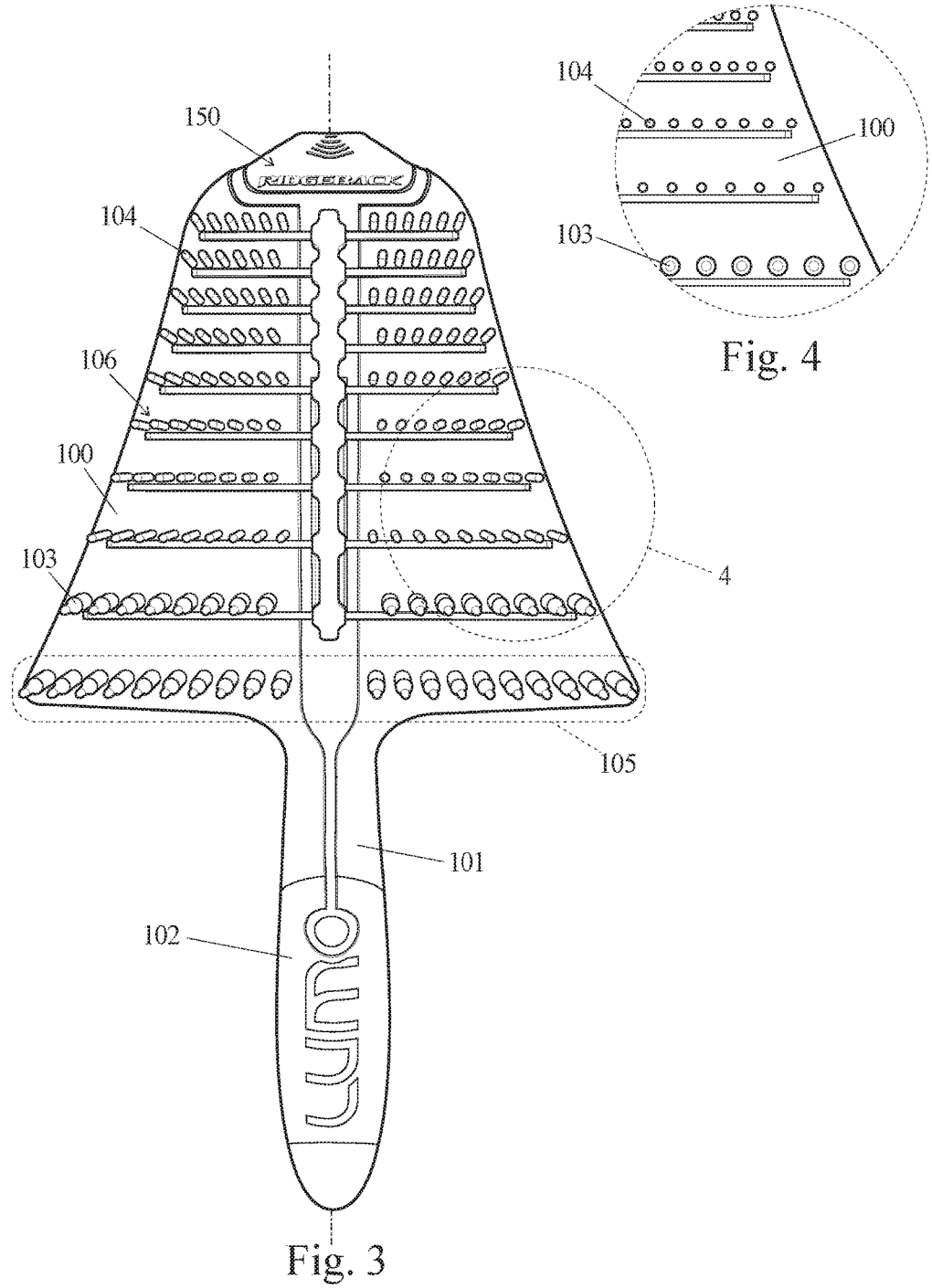
FIG. 3 is a front perspective view, illustrating the modulated array of comb tines.
FIG. 4 is an enlarged orthogonal front view of part of the comb tine array, illustrating the modulation of comb tine spacing, row by row, from coarse to fine, and modulation in the corresponding spacing between rows of combs, progressing from coarse to fine, in a direction opposed to the grooming motion.

FIG. 1 illustrates a handle 101, which is coupled to the bottom of the comb array support body 100, nearest the coarse comb part of the array 106 which includes large diameter tines 103, wherein the length of the handle 101 defines a principal longitudinal axis, as indicated in FIG. 3, to which the rows of combs 105 are transversely disposed. Each single row of regularly spaced tines 103, 104 constitutes a comb, as indicated by an example comb row 105 in FIG. 3. Several benefits from said orientation of the handle 101 relative to the array of comb tines 106 were ascertained following extensive experimentation. The ergonomics of the implement is a key factor in its grooming efficacy and as such, the arrangement of the handle 101 in the first embodiment enables the user to draw the implement towards them to effectuate grooming. Pulling the implement is a more comfortable modus than others found in the prior art. For example, certain tools of the prior art have handles which are coupled to the end of, and parallel to, the rows of combs. Given such a tool is operated by the lateral arm motion of the user, and the combs are some distance from the handhold, uncomfortable user wrist torque often results which reduces grooming efficacy.

In the first embodiment, the ergonomic position of the handhold 101 relative to the comb tine array 106 facilitates highly effective grooming, by minimizing the torque on the user's wrist during a grooming motion. The direction of grooming for the first embodiment is indicated by a motion arrow in FIG. 5. Negligible torque is applied to the user's wrist since it is operated by means of a pull type of motion, which is generally more comfortable for the user. Additionally whilst grooming, the user is required to perform a slight ulnar wrist deviation to rotate the face of the implement and ensure the finer section of the comb tine array 106, which includes the shorter and closely spaced comb tines 104, passes through the pet's coat. Thus, the tips of the tines 103, 104 of the implement are aligned to a curve 107 as shown in FIG. 6, so that the curved profile 107 of the embodiment minimizes the effort required to perform said implement face rotation.

The comb array support 100 and handle 101 are made from a rigid polymeric material, which is subsequently over-molded with a soft polymeric material in the grip area 102, so that the user can grasp the implement comfortably.

As illustrated in FIG. 1, the first two rows of combs 105 use large diameter tines 103, and the subsequent rows of combs 105 use small diameter tines 104, in the modulated array 106. The base diameter of the stocky tines 103 of the first embodiment is 3.0 mm, which has a fully rounded finer tip with diameter 1.5 mm. The diameter of the slender tines 104 of the first embodiment is 1.4 mm, with fully rounded tips. The large diameter tines 103 are provided in the coarse part of the array 106 where the tines 103 are longest. In the first embodiment for example, the longest stocky tines 103 cantilever 25.0 mm from the support. These tines 103 have the greatest cantilever from the main body 100, and are at risk of being deformed, which would reduce grooming effectiveness and foul the movement of the self-cleaning mechanism sub-assembly 150. The large diameter tines 103 are those which first work to detangle a pet's coat during a grooming motion, and thus receive significant drag forces during normal operation. Additionally, in an accidental case, the large diameter tines 103 may for example, be subject to a fall the height of a grooming table. The long, large diameter tine's 103 cross section therefore, has a greater bending stiffness than its small diameter tine counterpart 104, so that it has sufficient strength to resist permanent damage from both the normal and accidental forces that may be applied to the implement. The thickness of the comb tine's 103, 104 cross-section can reduce in a direction opposed to the grooming motion, since the comb tines 104 in the finer part of the array 106 are subject to lesser forces when collecting shed hair. Thus, small diameter tines 104 populate the remainder of the array 106, wherein the tine 104 to tine 104, and comb row 105 to comb row 105 spacing progresses, from coarse to fine, in a direction opposed to the grooming motion. In the first embodiment, said tine 103, 104 to tine 103, 104, and comb row 105 to comb row 105 spacings decrease monotonically, in a direction opposed to the grooming motion.

The comb tines 103, 104 of the first embodiment represented in FIG. 1 are made of a metal alloy material. The metal alloy is selected based on its yield strength and shear strength, so as to resist inordinate bending during grooming and ensure that the hair of the pet's coat passes through the tines 103, 104, and shed hair is collected. One of the additional concerns when selecting a metal alloy is that it is also lightweight, so that the implement is ergonomic.

Many tools of the prior art use cast aluminum alloys for the tines, given that it is lightweight and the desired shape can be easily molded in a mass manufacturing process, without need for subsequent machining. One of the disadvantages to using cast aluminum alloys however, is that the part is finished on being molded, and undergoes no further work process to add strength. Grooming tools with cast aluminum alloy tines tend not to be durable, since the tines readily bend and break during grooming, given their inadequate material yield strength and shear strength. For example, one of the strongest commercially available cast alloys available is 201-T7, an aluminum copper composite heat treated to a T7 temper for added strength. This cast alloy has a yield strength of 345 N/mm$^2$ and shear strength of 290 N/mm$^2$. However, cast aluminum alloys of much lower grades are generally used in tools found in the prior art.

It was determined, by considerable testing of various material options by the inventors, that there are significant benefits in using a properly selected wrought aluminum alloy. In particular, certain high strength wrought aluminum alloys exhibit much higher mechanical properties, yield strength and shear strength, than even one of the strongest cast alloys aforementioned. Wrought alloys, which begin as cast ingot, gain their strength during the mechanical deformation processes in fabricating the base material.

The base material chosen for the comb tines 103, 104 of the first embodiment is wire made of the wrought aluminum alloy grade 7075-T6, a 7000 series aluminum alloy which includes zinc as the primary alloying element, and heat treated to artificially age the material to a T6 temper for added strength. The wire is machined and cut to length produce the required tine 103, 104 profile. Numerous high strength wrought aluminum alloy grades are also viable, such as 7068-T76 or 2014-T651 from the 2000 aluminum copper composite series. The example material selected for the first embodiment, 7075-T6, is one of the strongest commercially available wrought aluminum alloys, with a yield strength of 510 N/mm$^2$ and shear strength of 331 N/mm$^2$. This particular alloy has long served the aerospace industry, since it offers a very high strength to density ratio, and thus the 7075-T6 high strength wrought aluminum alloy is used to fabricate the tines of the grooming implement 103, 104, so that it is stronger than existing tools. Using the 7075-T6 high strength wrought aluminum alloy as the base material to fabricate the tines 103, 104 of the array 106 ensures they have adequate strength, so as to certainly not permanently bend nor break when used to groom pets. Thus the implement is considerably more durable than the vast majority of tools found in the prior art. Moreover, the implement is ergonomic for the user, since for example, the strength of this wrought aluminum alloy material is comparable to common mild carbon steel and stainless steel alternative material choices for the tines 103, 104, yet one third as dense, such that the implement is lightweight.

In addition to the aforesaid strength deliberations in selecting a material for the comb tines 103, 104 to ensure they resist permanent deformation from both normal and accidental forces, proper consideration must also be given to the intrinsic elasticity of the material. The elastic modulus of a material quantifies its resistance to being deformed, and is a factor in determining the bending stiffness of the tines 103, 104. The elastic modulus of the 7075-T6 wrought aluminum alloy material selected for the tines 103, 104 of the first embodiment is 70,000 N/mm$^2$. The bending stiffness of the tines 103, 104, can be defined as a measure of how much force is required to laterally deflect the tips by a unit of distance. For the 25.0 mm long 3.0 mm diameter tines 103, the bending stiffness is 53.4 N/mm, and for the longest 1.4 mm diameter tines 104, 21.2 mm long, the bending stiffness is 4.2 N/mm. In intuitive terms, it is extremely unlikely a user would be able to use their index finger to push a large diameter tine 103 to the point where it is permanently deformed. Similarly, whilst it is possible for a user to permanently deform a small diameter tine 104 intentionally by pushing it with a finger, they would have to apply a significant and appreciable force to do so.

The relevancy of the tine's 103, 104 bending stiffness, as described intuitively above, is that whilst grooming a pet's coat, if the tines 103, 104 are too flexible they would bend and allow the hair of the pet's coat to pass underneath the implement, and not pass though the comb array 106 to effectuate grooming. The bending stiffness of the tines 103, 104 described above, is sufficient so as not to deflect greatly during grooming, and deliver excellent grooming performance. Furthermore, the strength and rigidity of the tines 103, 104, made from a high strength wrought aluminum alloy such as 7075-T6, provides the pet owner with a very durable implement.

By comparison, the vast majority of tools found in the prior art pay considerably less attention to comb tine material selection. As a result such tools have inferior grooming performance and lack longevity, requiring frequent replacement which is detrimental to our finite environmental resources. For example, a slicker is a commonly used grooming brush that comprises a dense arrangement of short, very small diameter metal wire bristles. These wire bristles are very flexible and can be easily flattened down when depressed by a finger, unlike the tines of the various embodiments disclosed herein. As such, a slicker brush poorly performs when grooming through thick coats, especially if the coat is tangled, since the bristles bend and the pet's hair does not pass through the brush. In addition, the bristles are very prone to being permanently flattened down by the forces exerted on them during extensive grooming, and accidental forces when for example, the product is dropped, and thus such tools have a relatively short lifecycle.

In other embodiments, a lightweight polymeric material could be used to form the tines 103, 104 monolithically with the main body 100. In such embodiments, the material for the single solid would need to have a similar or greater shear strength, yield strength and elastic modulus to that aforementioned for the 7075-T6 wrought aluminum alloy example; 331 N/mm$^2$, 510 N/mm$^2$ and 70,000 N/mm$^2$ respectively. Several carbon fiber reinforced plastics, and some glass fiber reinforced plastics offer acceptable material alternatives that would enable the tines 103, 104 to be formed monolithically with the main body 100 which supports the combs 105, and have sufficient stiffness so as to resist excessive bending during grooming.

In FIG. 1, the self-cleaning mechanism sub-assembly 150 is located in the center of the main body 100 of the implement, and is shown in the at rest position.

Figure 2:
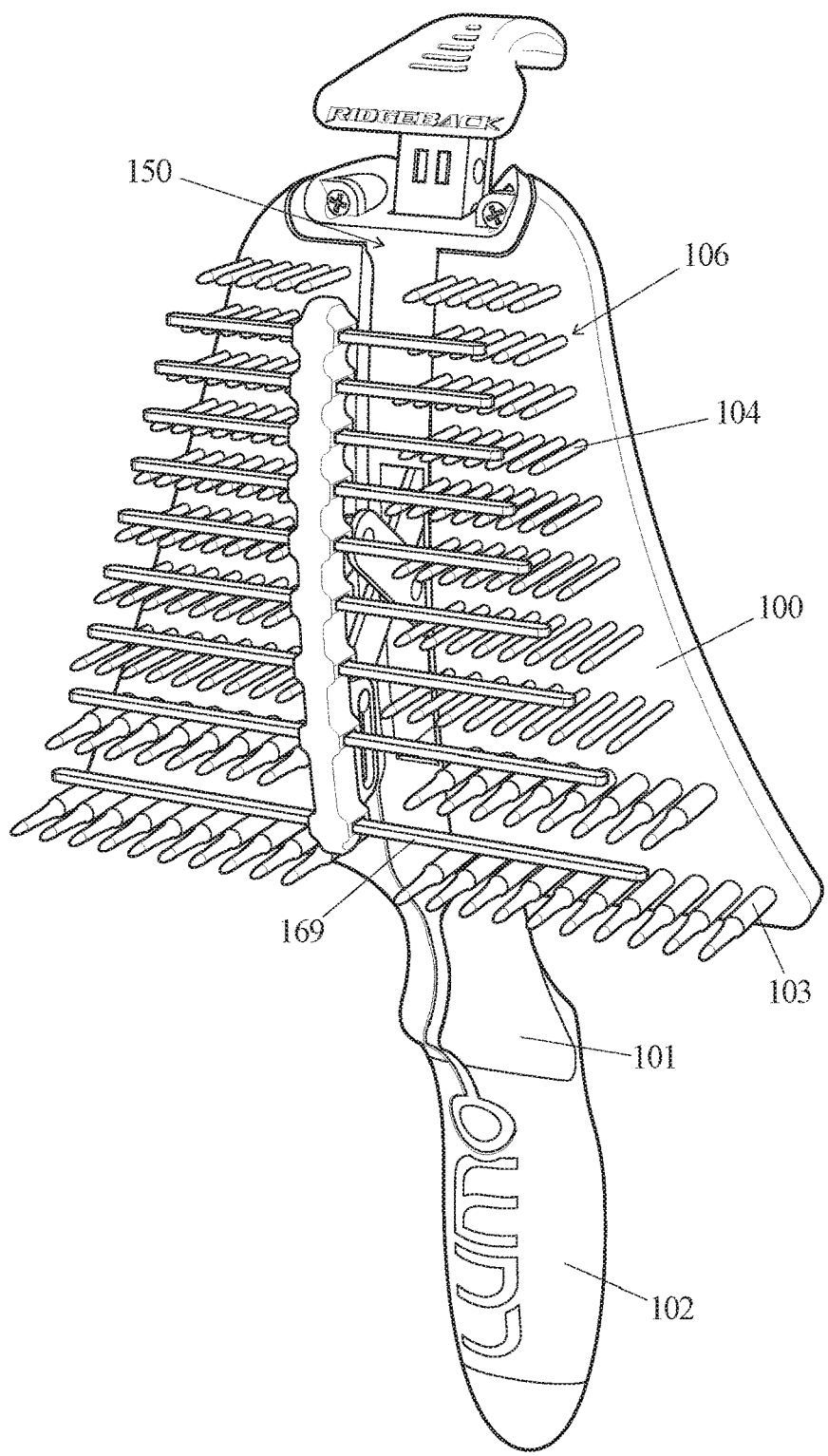
FIG. 2 is an oblique front perspective view, with the self-cleaning mechanism in the final actuated position.

FIG. 2 illustrates an oblique front perspective view of the first embodiment, wherein the self-cleaning sub-assembly 150 has been actuated. Following a period of time grooming a pet's coat, the comb array 106 will collect shed hair, which may be subsequently removed from the implement when the user actuates the self-cleaning mechanism 150. When operated by the user, the mechanism 150 rapidly protracts comb cleaning cross-bars 169 in the comb row 105 interstices, away from the main body 100, to force collected shed hair off the comb array 106. The user may then proceed to groom with a clean implement.

FIG. 3 presents a front perspective view of the first embodiment, wherein the longitudinal axis defined by the handle 101 is indicated, and to which, the rows of combs 105 are disposed transversely. A portion of the figure is enlarged in FIG. 4, intended to illustrate in detail, the modulated tine arrangement of the comb array 106.

FIG. 4 is an enlarged orthogonal front view of part of the comb tine array 106. The figure exemplifies the modulation of comb tine 103, 104 spacing, comb row 105 by comb row 105, from coarse to fine, and the corresponding modulation of the spacing between combs rows 105, progressing from coarse to fine, in a direction opposed to the grooming motion. The direction in which the implement is drawn to effectuate grooming is noted by the motion arrow in FIG. 5.

In FIG. 4, the comb rows 105 at the bottom of the implement comprise long, large diameter comb tines 103, with a coarse tine 103 to tine 103 spacing in a given row 105, and a coarse comb row 105 to comb row 105 spacing. In the coarsest section of the comb array 106 of the first embodiment, the tines 103 are spaced apart by 5.0 mm, and comb rows 105 spaced apart by 12.0 mm. These coarse combs 105 with large diameter tines 103 first detangle the coat at a selected location, and remove shed hair from the base of the pet's coat, commonly referred to as undercoat. As a grooming motion continues and the implement is drawn past the selected location, the comb tines 104 progressively become shorter in length, the tine 104 to tine 104 spacing in a given comb row 105 becomes finer, and the comb row 105 to comb row 105 spacing also becomes finer, to collect shed hair from throughout the pet's coat. In the finest section of the comb array 106 of the first embodiment, the tines 104 are spaced apart by 3.0 mm, and comb rows 105 spaced apart by 5.0 mm. Therefore, the implement both detangles and desheds a pet's coat in one grooming motion.

In addition, the positions of the tine 103, 104 tips are staggered comb row 105 by comb row 105, as illustrated in the enlarged comb array 106 view of FIG. 4. The alternation of tine 103, 104 position, from one comb row 105 to the next, prevents shed hair from easily passing through the comb array 106 during a grooming motion. Since there is no clear path through the array of comb tines 106, shed hair is very effectively collected.

Several benefits arise from the aforementioned comb tine arrangement 103, 104, elucidated by the comb array 106 of the first embodiment. Firstly, the implement increases grooming efficiency, where the average time required to groom a pet is significantly reduced given that it can be performed with one implement, as opposed to using several coarse and fine tools of the prior art to accomplish the same result. Secondly, the implement provides a comfortable and pain free grooming experience for the pet, wherein the modulated array of comb tines 106 ensure that the coat is effectively detangled with the coarse combs 105 with large diameter tines 103, before the finer combs 105 of smaller diameter tines 104 pass through to collect shed hair. Thus the implement is safe, since it does not pull on a pet's coat, nor remove healthy hair. Finally, a benefit of note is that as the implement removes shed hair, the appearance and sheen of the pet's coat is improved, enabling natural oils from the sebaceous gland to spread along the hair shaft, otherwise trapped by dead shed hair.

Figure 5:
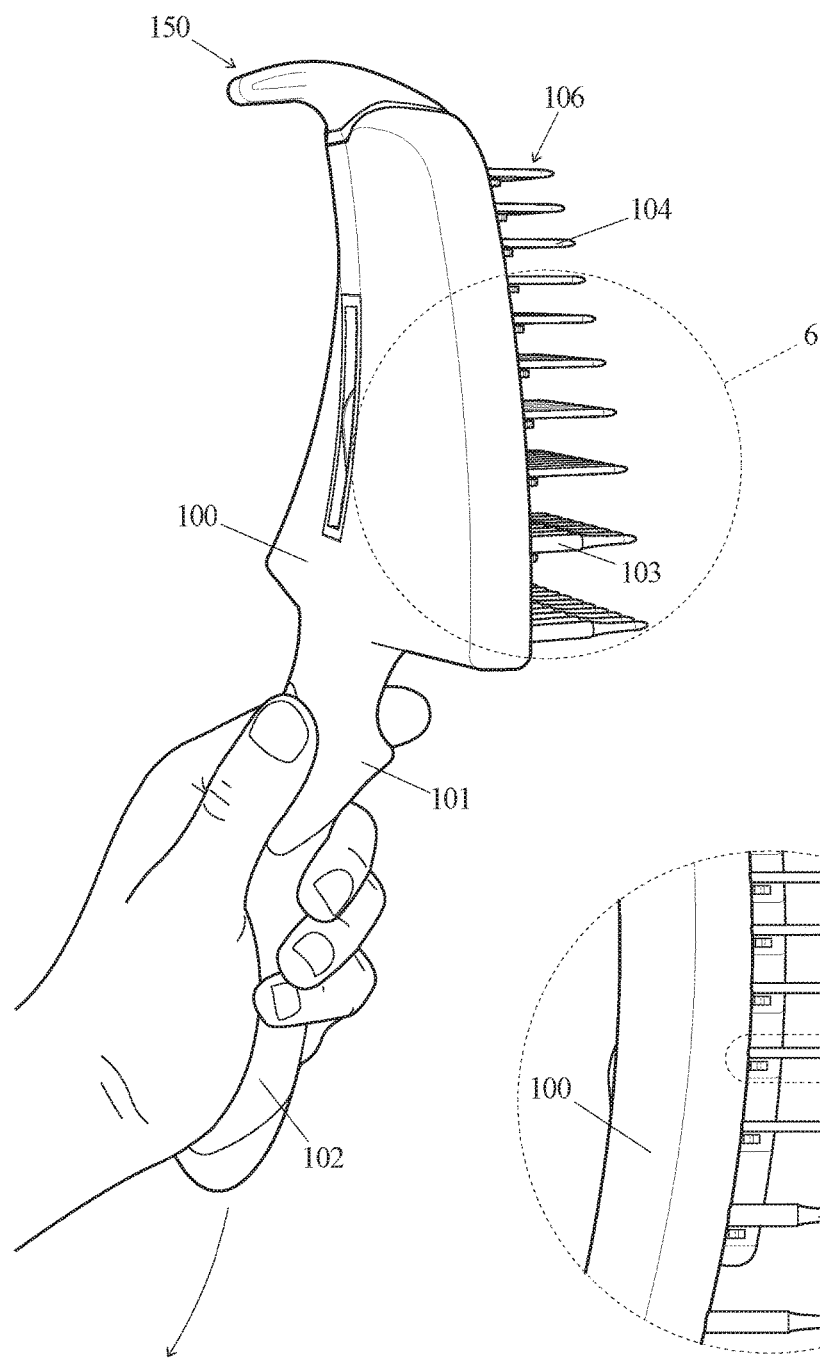
FIG. 5 is an oblique rear perspective view, with the self-cleaning mechanism in the at rest position, indicating the intended manner in which the first embodiment is to be held by the user and the direction of grooming motion.
Figure 6:
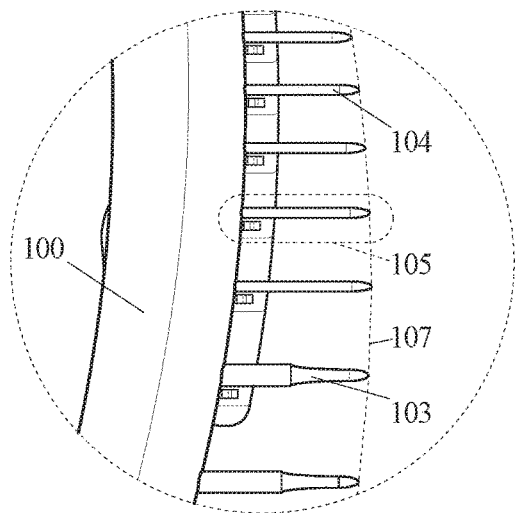
FIG. 6 is an enlarged orthogonal side view of part of the comb tine array, illustrating the modulation in spacing between rows of combs, progressing from coarse to fine, in a direction opposed to the grooming motion. In addition.

FIG. 5 provides an oblique rear perspective view of the implement, with the self-cleaning mechanism 150 at rest, and the intended manner in which the first embodiment is to be held by the user is indicated. The direction in which the implement is drawn through a pet's coat to effectuate grooming is indicated in FIG. 5 by a motion arrow. A portion of the figure is enlarged in FIG. 6, which illustrates in detail, the side profile of the first embodiment.

FIG. 6 exhibits an enlarged orthogonal side view of part of the implement. The figure demonstrates the modulation of comb row 105 spacing, from a wide comb row 105 to comb row 105 spacing at the bottom of the implement, progressively becoming closer together towards the top, and congruent with the reduction in tine 103, 104 to tine 103, 104 spacing to produce a modulated comb tine array 106, from coarse to fine, in a direction opposed to the grooming motion. It was ascertained by the inventors, following considerable experimentation, that the modulation of spacing between comb rows 105 in combination with the modulation of tine 103, 104 spacing, from coarse to fine, is crucial to the implement's effectiveness. In order for the implement to groom most excellently, the tines 103, 104 must first penetrate the pet's coat, and be in contact with the scalp, to ensure that the pet's hair passes through the comb array 106 during a grooming motion, and shed hair is collected. The coarse part of the comb array 106 is first in contact with the pet's coat during a grooming motion. In this section of the comb array 106, the tines 103 are sparsely located, and thus it facilitates the penetration of the comb tines 103 through the pet's coat. Once the comb array 106 is in contact with the pet's scalp, the hair will continue to pass through the denser sections of the comb array 106 containing combs with more closely spaced tines 104, as it is drawn through the coat.

The curved profile 107 of the first embodiment is also depicted in FIG. 6. The tips of the comb tines 103, 104, are aligned to a curve 107. In the first embodiment, viewed in profile, the curve 107 is an arc with a radius of 200 mm. The tines 103 in the coarse section of the comb array 106 are 25.0 mm long, so that they can penetrate to the base of the pet's thick, long haired coat and remove loose undercoat. The tines 104 in the finer portion of the comb array 106 become progressively shorter to a length of 14.0 mm, wherein the various tine 103, 104 lengths of each comb row 105 remove shed hair throughout the thickness of the coat. The implement has a curved profile 107, so that the rotation of the user's wrist is minimized when rotating the face of the implement to pass the finer portion of the comb tine array 106 through the coat, during a single grooming motion.

Figure 7:
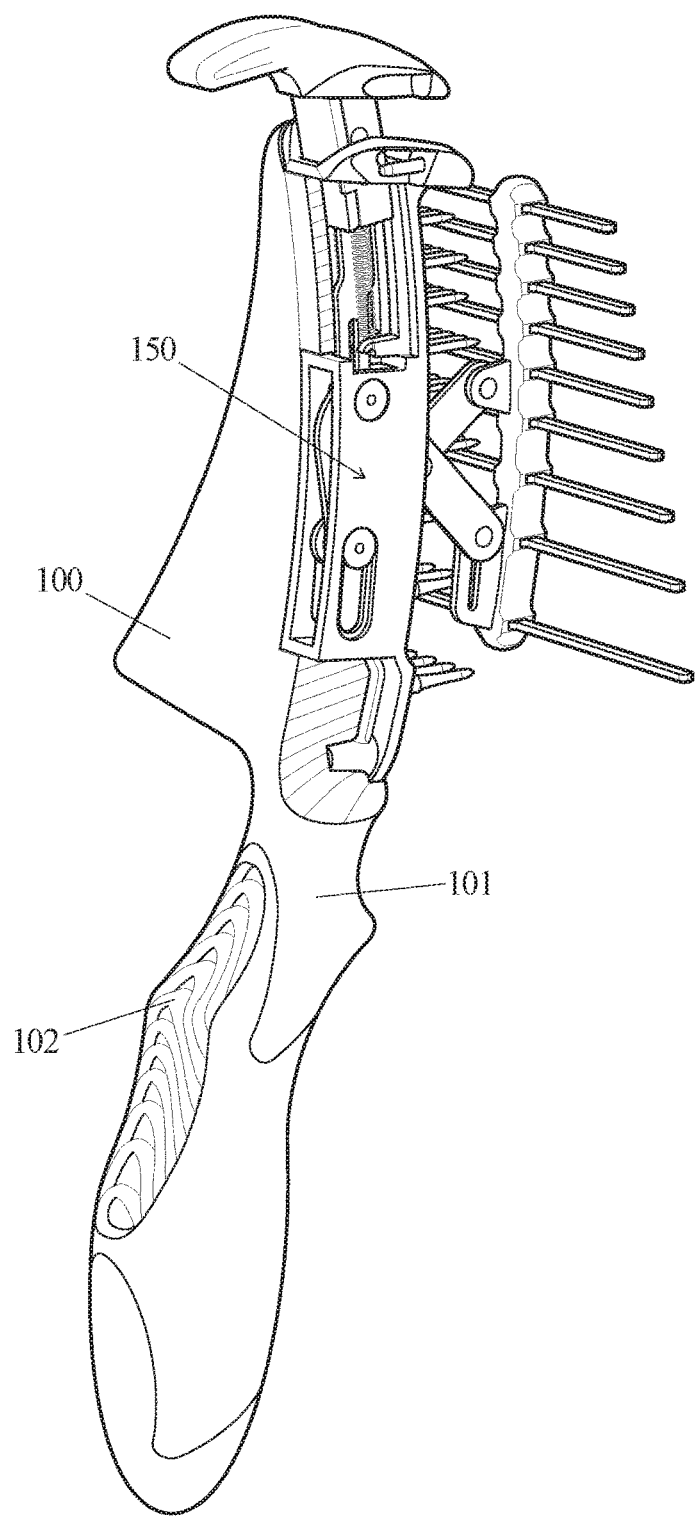
FIG. 7 is a partial sectional view to reveal the inner self-cleaning mechanism sub-assembly.
Figure 8:
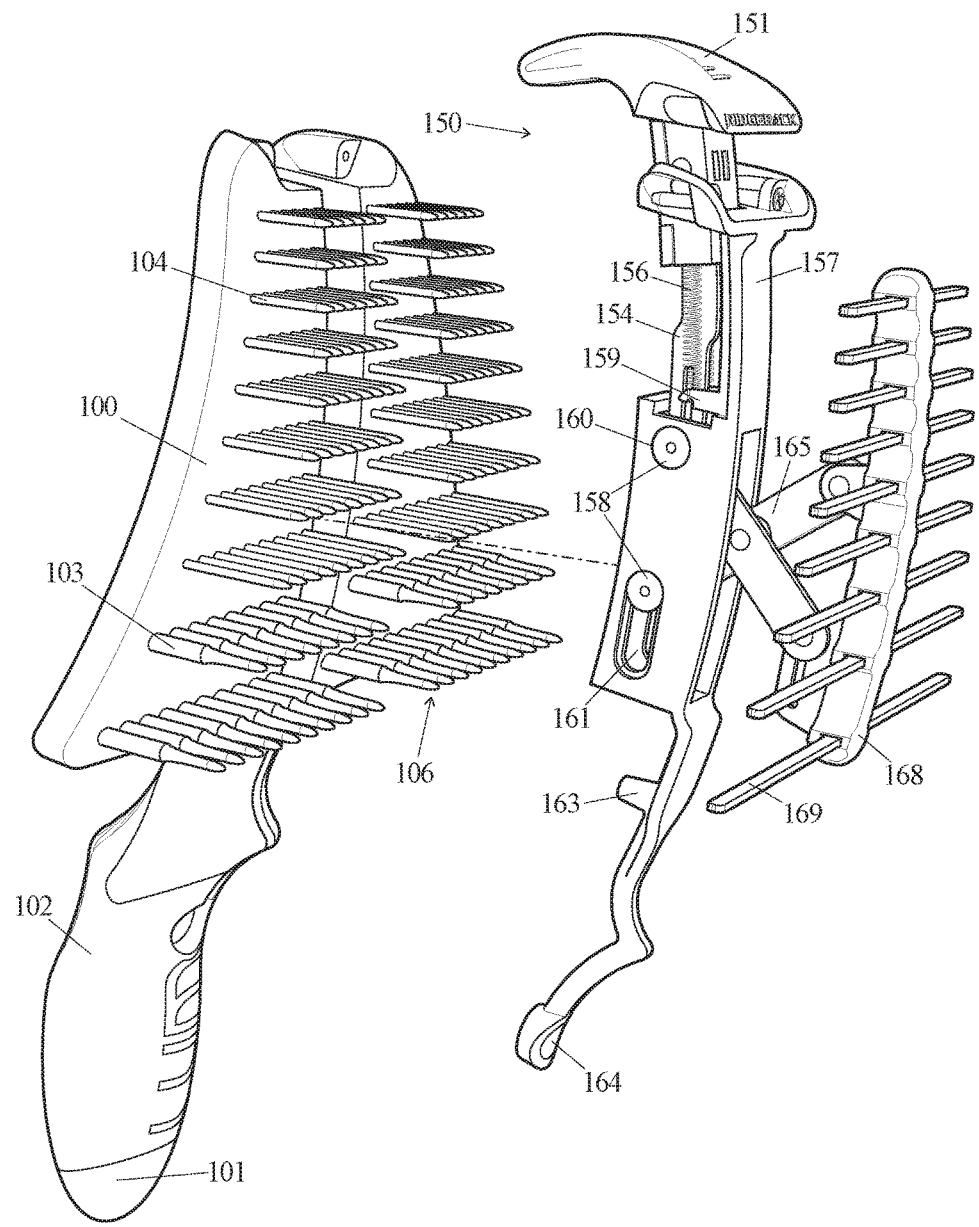
FIG. 8 is an exploded view in which the self-cleaning mechanism sub-assembly has been removed from the main body and handle of the implement.

FIG. 7 is a partial sectional view of the first embodiment, which reveals the inner self-cleaning mechanism sub-assembly 150. Additionally, FIG. 7 illustrates the overlapping folds of soft polymer over-mold 102 on the rear of the handle 101, providing a textured surface for the user to securely hold. In FIG. 8, the self-cleaning mechanism sub-assembly 150 has been removed from the main body of the implement 100, in an exploded view.

Figure 9:
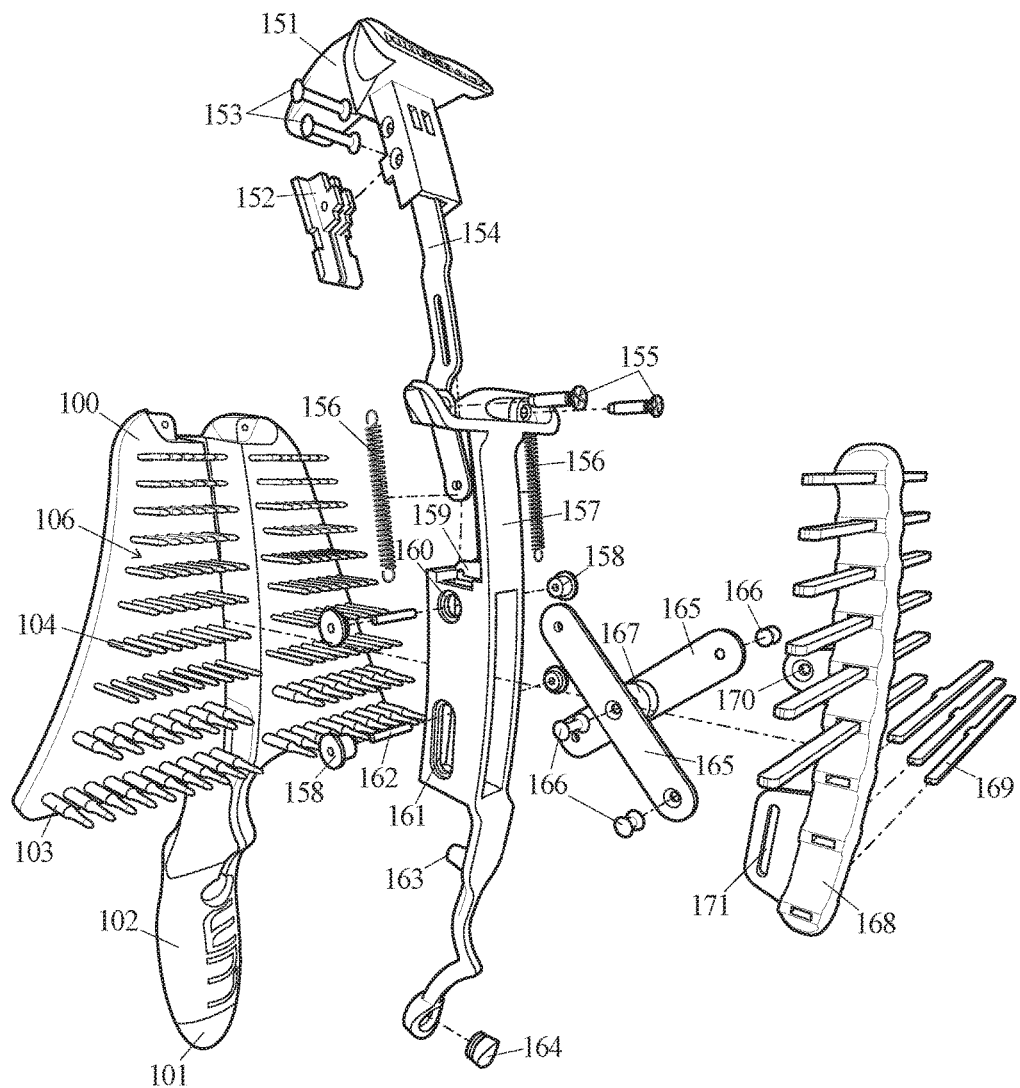
FIG. 9 is an exploded view of all components.

FIG. 9 provides a view of the first embodiment, further exploded, with all components broken out from the self-cleaning mechanism sub-assembly 150. This figure, which provides a clear view to all parts, will be referred to in the subsequent description of FIG. 10A and FIG. 10B, which explicates the works of the self-cleaning mechanism sub-assembly 150 in detail.

Figure 10A:
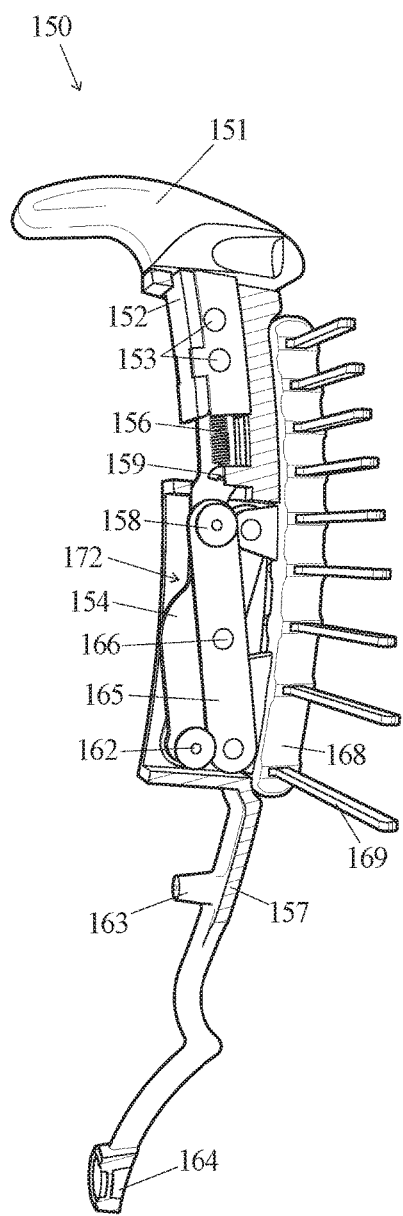
FIG. 10A is a sectional view of the self-cleaning mechanism sub-assembly, in the at rest position.
Figure 10B:
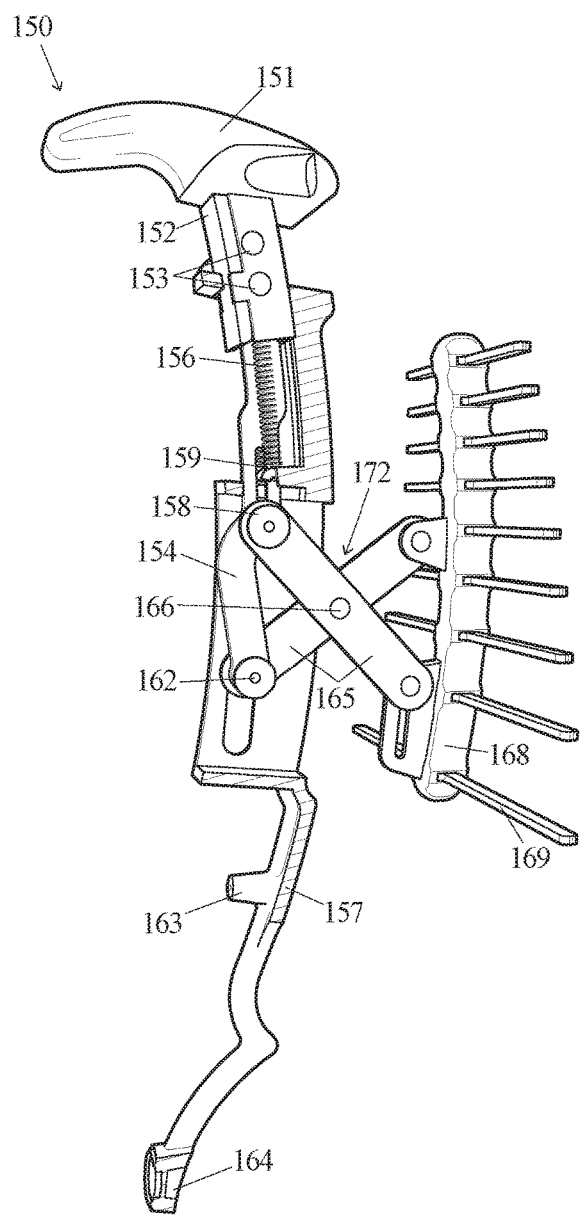
FIG. 10B is a sectional view of the self-cleaning mechanism sub-assembly, in the final actuated position.

FIG. 10A is a sectional view of the self-cleaning mechanism sub-assembly 150, in the at rest position, and in FIG. 10B the mechanism 150 has been fully actuated. The self-cleaning mechanism sub-assembly 150 is contained within a housing 157, which is inserted in, and mounted to, the main body 100 of the implement which also supports the combs 105. In the first embodiment, the mechanism housing 157 is made of a polymeric material. The mechanism housing 157 is connected to the main body of the implement 100 by two screws 155 at the top of the housing 157, and elsewhere connected using ultrasonic weld studs 163 and 164.

A pantograph sub-assembly 172 is located in the center of the self-cleaning mechanism sub-assembly 150, the type of which is commonly referred to as a scissor mechanism. The pantograph 172 is formed by two bars 165, joined together centrally by a rivet 166 through a pivot spacer washer 167, and is connected to an actuating bar 154 to open and close the linkage. The fixed axle of the pantograph 172 is provided by a top pin 162, located in the top hole 160 through the housing side walls 157. The sliding axle is provided by a bottom pin 162, located in the bottom guide hole 161 of the housing side walls 157. The mechanism pins 162 are held in place by end caps 158, which also serve as spacer washers to guide the pantograph bars 165 in motion and keep them aligned with the longitudinal axis of the implement.

The bars 165 of the pantograph 172 are connected by two rivets 166 to a central spine 168, which supports the comb 105 cleaning cross-bars 169 located in the comb row 105 interstices. A corresponding fixed top hole 170 and slotted guide hole 171 is provided in the spine 168, matching the fixed 160 and sliding axle holes 161 as provided in the housing side walls 157. The central spine 168 is made of a polymeric material, and the generally parallel cross bars 169 are made of the high strength wrought aluminum alloy 7075-T6, for the reasons aforementioned for the comb tines 103, 104. The comb 105 cleaning cross-bar sub-assembly 168, 169 is of a minimal form factor, such that it is lightweight and in accordance with the overall ergonomic design of the implement.

The mechanism 150 is operated when the user pulls the knob 151, which is connected to the actuation bar 154 and powers the pantograph 172 which extends outward relative to the main body 100 of the implement, which supports the combs 105. The pantograph bars 165 and the actuating bar 154, are made of the same high strength aluminum alloy material as the tines 103, 104 and cross-bars 169 to ensure the implement is lightweight. The user operable knob 151 is connected to the actuating bar 154 by means of a connector piece 152, and secured by two rivets 153.

Shed hair quickly accumulates in the grooming implement when used. The self-cleaning feature 150 of the first embodiment enables the user to simply and instantly push all collected hair off the implement, before subsequently proceeding with clean combs 105. The benefit of using of a pantograph 172 to clean the implement is such that, when the user pulls the knob 151 to activate the mechanism, their input pull motion is amplified to provide a greater lateral cleaning motion by the cross-bars 169. The stroke of the lateral cleaning movement is greater than the required input stroke, such that the implement is ergonomic, and has the ability to clean between comb rows 105 where the tines 103, 104 have considerable length.

Once the self-cleaning mechanism 150 has been protracted, and shed hair cleaned from the implement, two extension return springs 156, provided between hooks 159 in the housing 157 and the rivets 153 through the actuating bar connector 152 and actuating knob 151, will revert the sub-assembly 150 to the at rest position, when the user releases the actuating knob 151.

The second embodiment illustrates an alternative, whereby comb plates with a number of tines in each piece are used to form the modulated array of tines, instead of discrete tines as presented in the first embodiment.

FIG. 11 shows an oblique front perspective view of the second embodiment. The second embodiment is alike the first embodiment, wherein the size of the implement, principal longitudinal axis as defined by the handle 201, self-cleaning mechanism 250 and length and position of the tines in the comb plates 203 of the modulated comb array 206 are the same. However, the second embodiment illustrates an alternative where comb plates 203 are secured in the supporting body 200 of the implement, in lieu of individual tines. As similarly defined in the first embodiment, the handle 201 length describes a longitudinal axis to which the comb plates 203 are transversely disposed. The handle 201 is over-molded with a soft polymer grip 202, solely in the area in which the handle 201 is held by the user. The comb plates 203 may also be made of the same 7075-T6 high strength wrought aluminum alloy plate, as used in the first embodiment to fabricate the tines, with a thickness of 1.6 mm.

The third embodiment exemplifies the same principles of the modulated comb tine array and self-cleaning mechanism as in the preceding embodiments, yet in an implement of reduced size given it is intended for use on small pets with long haired coats. Small pets have less coat surface area and more confined spaces in which to groom, and so a reduced array of comb tines in a smaller implement is more ergonomic to use. The bounding size of the third embodiment is 205 mm long, 85 mm wide and 80 mm deep.

FIG. 12 portrays an oblique front perspective view of the third embodiment. The main body 300 which supports the rows of comb tines 303, 304 and the handle 301 of the implement has a smaller size than the previous embodiments, although the same design fundamentals and ergonomic considerations are apparent. The handle 301 defines the same longitudinal axis as in the foregoing embodiments, and is over-molded with a soft polymer grip 302 to provide a comfortable clasp area for the user.

A single row of large diameter tines 303 is provided in the coarse section of the comb array 306 since small pets typically have less dense coats than larger pets. The single row of long, large diameter tines 303 is sufficient to resist the drag force that is imparted to them during the detangling of a small pet's long haired coat. As the user performs a grooming motion, the first comb with a coarse tine 303 to tine 303 spacing is brought into contact with the pet's coat at a selected location. Small diameter tines 304 fill the remainder of the comb array 306, wherein the pet's hair at the selected location experiences a grooming progression, from coarse to fine, with respect to tine to tine and row to row spacing, as the implement is drawn past the selected location. The direction of grooming for the third embodiment is the same as that of the larger first embodiment, as indicated by the motion arrow in FIG. 5. In the coarsest section of the comb array 306 of the third embodiment, the tines 303 are spaced apart by 5.0 mm, and the space between the comb rows is 12.0 mm. These spacings progressively reduce in a direction opposed to the grooming motion, to 3.0 mm and 5.0 mm respectively, in the finer section of the comb array 306 which contains small diameter tines 304. In the third embodiment, the longest stocky tine 303 cantilevers 25.0 mm from the support, and the shortest slender tine 304 cantilevers 14.0 mm from the support. The diameter of the stocky tines 303 is 3.0 mm, which has a fully rounded finer tip with diameter 1.5 mm. The diameter of the slender tines 304 is 1.4 mm. The thickness of the comb tine's 303, 304 cross-section reduces in a direction opposed to the grooming motion, since the first comb tines 303 in the comb array 306 are subject to large forces when detangling the pet's coat, and the subsequent comb tines 304 experience lesser forces when collecting shed hair. Alike the previous embodiments, a smaller self-cleaning mechanism sub-assembly 350 nests centrally in the main body of the implement 300.

FIG. 13A provides a sectional view of the self-cleaning mechanism sub-assembly 350 of the third embodiment in the at rest position, and FIG. 13B shows the sub-assembly 350 when fully actuated. The fundamental principles of this mechanism, and construction materials, are the same are those described in detail for the first embodiment. However, the self-cleaning mechanism sub-assembly 350 of the third embodiment illustrates an alternative where a tapered compression return spring 356 may be used, as opposed to extension return springs 156 in the previous embodiments. In the previous embodiments, the extending return springs 156 require space for their body length, plus the amount to which they are extended as the mechanism protracts. By comparison, as the mechanism of the third embodiment is actuated, the tapered compression return spring 356 contracts within the space of its own body, thus resulting in a more compact sub-assembly arrangement 350, such that the implement can have the smaller form factor required for use on small pets.

A fourth embodiment offers an example whereby an implement intended for large pets with long haired coats may be produced with a small form factor, by means of a hand strap is affixed to the rear of the implement body for a handhold. This embodiment encompasses the same innovative grooming concepts as the first embodiment described in detail, yet in a more compact bounding size of 110 mm high, 85 mm wide and 80 mm deep.

FIG. 14A shows an oblique front perspective view of the fourth embodiment. The fourth embodiment is alike the first embodiment, wherein the comb tine array 406 and self-cleaning mechanism 450 are same. The adjustable hand strap 401 alternative is illustrated in the oblique rear perspective view of FIG. 14B. The longitudinal axis described by the hand strap 401 is indicated in the figure, and is the same as delineated by the handles of all the foregoing embodiments. Correspondingly, the rows of combs in the array 406 are arranged transversely to said longitudinal axis.

FIG. 14C illustrates the manner in which the fourth embodiment is intended to be held by the user, and the direction of grooming is indicated by the motion arrow. The adjustable hand strap 401 is affixed to the rear of the implement body 400 which supports the comb tine array 406, and is oriented transversely to, and directly behind, the rows of the comb tine array 406. The ergonomics of the implement is a key factor in its grooming efficacy, and as with the previous embodiments, considerable testing was performed to determine the importance of the transverse orientation of the handhold 401 longitudinal axis with respect to the rows of the comb tine array 406. In the fourth embodiment, the user will move their arm laterally to groom, with a negligible torque on their wrist, since the user's hand is located close to the comb tine array 406.

The fifth embodiment is similar to the fourth embodiment, with the exception of the handhold. In the fifth embodiment, a further handhold alternative is presented, wherein an inverted handle is coupled to the rear of the body of the implement. The bounding size of this embodiment is 110 mm high, 85 mm wide and 85 mm deep.

FIG. 15A depicts an oblique front perspective view of the fifth embodiment. The inverted handle 501, coupled to the rear of the implement body 500 which supports the comb tine array 506, is apparent in FIG. 15B, an oblique rear perspective view of the embodiment. The handle of this embodiment 501 defines the same longitudinal axis as disclosed in all previous embodiments, and furthermore, the rows of tines in the comb array 506 are disposed transversely to said axis. The inverted handle 501 is over-molded with a soft polymer grip 502, to provide a comfortable area for the user to grasp.

FIG. 15C demonstrates the intended modus in which the embodiment is held by the user. The torque applied to the user's wrist is low, given the proximity of the hold position to the comb array 506, and the transverse orientation of comb rows with respect to the handle 501 enables the user to groom by pulling the implement towards them. The direction of grooming is denoted by the motion arrow in FIG. 15C. A pulling type of motion is most comfortable for a user to perform compared to some tools of the prior art. In certain tools of the prior art, the handle is coupled at the end of, and parallel to, the rows of combs. Such tools are operated by lateral arm motion, and wherein the combs are some distance from the hold position, uncomfortable levels of user wrist torque are generated, reducing grooming effectiveness.

The sixth embodiment is a modification of the first embodiment, wherein the self-cleaning mechanism has been omitted. This embodiment offers pet owners a lower priced implement to groom large pets with long haired coats, since the embodiment must be cleaned manually.

FIG. 16A provides a front oblique perspective view of the sixth embodiment. The sixth embodiment is analogous to the first embodiment aforementioned, without the self-cleaning mechanism sub-assembly 150 shown in FIG. 8. Where the self-cleaning mechanism sub-assembly 150 has been omitted in the sixth embodiment, a central cleft region 680 which is without of tines in the comb tine array 606 remains. The cleft region 680 in the comb tine array 606 is oriented along the longitudinal axis described by the handle 601. The central cleft region, devoid of tines, is approximately the width of a human finger. This central cleft region 680 is designed to enable users to pinch the mass of shed hair collected in the comb tine array 606, with their thumb and index finger, to clean it from the implement. With respect to the view shown in FIG. 16A, the bounding size of the sixth embodiment is 230 mm long, 115 mm wide and 80 mm deep.

Tools of the prior art which are not self-cleaning, are especially difficult to manually clean. Such tools are cumbersome for users to clean since they cannot pick through the mass of collected hair, since the tines are so closely spaced together. To the contrary, the sixth embodiment illustrates the novel and innovative approach to enable a user to manually clean the implement quite readily, by providing a central cleft region 680 in the comb tine array 606. The cleft region 680 in the comb tine array 606 gives the user's index finger and thumb space to pinch though to the front face of the comb tine array support body 600. Since the shed hair becomes entwined as collected in the comb tine array 606 during grooming, the majority of the shed hair mass can be removed from the implement when the user pinches and pulls on the mass centrally.

A seventh embodiment, similar to the third, discloses an implement for small pets with long haired coats, which requires manual cleaning by pinching collected hair from the central cleft region 780. This embodiment, as shown in FIG. 17A, has a reduced bounding size of is 205 mm long, 85 mm wide and 80 mm deep, since small pets have a lesser coat surface area and tighter contours to groom.

The eighth and ninth embodiments disclose implements designed for grooming large pets with short haired coats. These embodiments are similar, except that the eighth embodiment, exhibited in FIG. 18A, includes a self-cleaning mechanism 850, whereas the ninth embodiment depicted in FIG. 19 does not and is designed to be cleaned manually by pinching hair from a central cleft region 980, devoid of tines, in the comb tine array 906. The bounding size of these embodiments is 115 mm wide, 230 mm long and 80 mm deep. With respect to ergonomics, and design to facilitate self-cleaning and manual cleaning, these embodiments encompass the same considerations as discussed in the descriptions of the foregoing embodiments. Where these embodiments differ however from all the previous embodiments, is in the type and arrangement of tines 804, 904 in the comb tine arrays 806, 906.

The comb tine arrays 806, 906 of the eighth and ninth embodiments are identical. Their merits are explicated with reference to FIG. 20, an enlarged front orthogonal view of the comb tine array 906 of the ninth embodiment. The comb tine array 906 comprises a dense arrangement of short tines 904, which may be made from a high strength wrought aluminum alloy, such as 7075-T6, and is designed to gather fine shed hair. Each comb row 905 contains small diameter tines 904 which are closely spaced together. The spacing between the tips of the tines 904 is 2.5 mm. The diameter of the slender tines 904 of the ninth embodiment is 1.4 mm, with fully rounded tips. In addition, all of the rows of combs 905 are closely spaced, 5.0 mm apart. Comb row 905 by comb row 905, the position of the tips of the tines 904 are staggered, such that the tines 904 of one comb row 905, are positioned in the interstices between tines 904 of adjacent rows 905. This dense spatial arrangement of tines 904 in the array 906 maximizes grooming performance for short haired pets, where the multitude of fine combs 905 minimize any clear path for fine shed hair to pass through the comb tine array 906, such that it is collected.

The coats of pets with short hair rarely tangle, and furthermore, their coats are thin, eliminating the need for long stocky tines in this comb tine array 906. Thus, the comb array 906 includes only small diameter comb tines 904 of a uniform short length. The rows of combs 905 are disposed transversely with respect to the longitudinal axis described by the handle 901, decided after extensive experimentation to determine the most effective and ergonomic grooming modus, wherein the user comfortably pulls the implement toward them to effectuate grooming. The direction of grooming motion, and intended manner in which the ninth embodiment is to be held, are indicated in FIG. 21. The tips of the comb tines 904 are aligned to a profile curve 907, as shown in FIG. 22, to minimize the amount of wrist rotation required of a user during a grooming motion. In the ninth embodiment, viewed in profile, the curve 907 is an arc with a radius of 200 mm. In addition, the comb support body 900 and tine array 906 has a tapered shape, becoming narrower with distance from the handle 901 to allow the user to groom confined areas of the pet's coat.

Finally, the tenth and eleventh embodiments enucleate implements designed for grooming small pets with short haired coats. These embodiments are similar to the aforementioned eighth and ninth embodiments, with reduced comb tine arrays 1006, 1106, since small pets have less surface area to groom. The bounding size of these embodiments is 205 mm long, 85 mm wide and 80 mm deep.

The tenth embodiment, portrayed in FIG. 23A, is a model which includes a self-cleaning mechanism 1050. The eleventh embodiment, exhibited in FIG. 24A, is intended to be a lower priced model, given the self-cleaning mechanism is excluded and it is cleaned manually by pinch action in the central cleft region 1180 to remove collected hair. The comb tine arrays 1006, 1106 are identical, and have a similarly dense arrangement to the comb tine arrays 806, 906, as described for the eighth and ninth embodiments.

The embodiments described above are intended to be merely exemplary; numerous variations and modifications will be apparent to those skilled in the art. All such variations and modifications are intended to be within the scope of the present disclosure.

What is claimed is:

1. An implement for grooming hair of an animal, comprising:
    a handle having a length defining a longitudinal axis of the implement;
    a comb support having first and second opposed ends, the first end being coupled to the handle;
    an array of substantially rigid tines mounted to the comb support, each tine having (i) a base, by which it is mounted to the comb support, (ii) a tip, (iii) a length that protrudes from the base to the tip, and (iv) a width at where the tine protrudes from its base, wherein the array is configured so that a selected tine has a length that is more than three times greater than the width of the selected tine, the array having a plurality of generally parallel combs, wherein any selected comb in the array has a set of regularly spaced generally parallel tines of similar length, and each comb has a length disposed transversely with respect to the longitudinal axis, and the comb support is configured in relation to the combs so that substantially all of the length of each tine is exposed for use in grooming;
    wherein the spacing between adjacent tines of a selected comb in the array monotonically decreases as a function of distance of the selected comb from the first end, in a manner wherein there are at least three distinct spacings between centers of adjacent tines in the combs of the array;
    so that, as the comb support is drawn in a direction of motion along the longitudinal axis to effectuate the grooming of the hair of the animal, in a manner wherein the first end reaches a selected location on the animal and thereafter the second end reaches the selected location, hair at the selected location experiences a progression in at least three stages from coarsely to more finely spaced tines;
    wherein the tines of the array are configured to penetrate and groom the hair of the animal,
    wherein the length of the tines of the selected comb monotonically decreases as a function of distance of the selected comb from the first end;
    so that, as the comb support is drawn in the direction of motion along the longitudinal axis to effectuate the grooming of the hair of the animal, hair at the selected location experiences a progression from longer to shorter tines.

2. An implement according to claim 1,
    wherein spacing between successive pairs of adjacent combs decreases monotonically as a function of distance along the longitudinal axis of each successive pair from the first end, in a manner wherein there are at least three distinct spacings of pairs of adjacent combs;
    so that, as the comb support is drawn in a direction of motion along the longitudinal axis the hair at the selected location experiences a progression in at least three stages from coarsely to more finely spaced pairs of adjacent combs.

3. An implement according to claim 1, wherein the array of tines is mounted to the comb support in a manner wherein the tips of the set of tines of each comb collectively define a surface that is curved.

4. An implement according to claim 1,
    wherein each comb is established by mounting a row of tines to the comb support, and the tines have a thickness in cross-section where they are mounted to the comb support, the thickness of tines of the selected comb also monotonically decreases as a function of distance of the selected comb from the first end;
    so that, as the comb support is drawn in the direction of motion along the longitudinal axis to effectuate the grooming of the hair of the animal, hair at the selected location experiences a progression from thicker to thinner tines.

5. An implement according to claim 4, wherein the tines comprise a wrought aluminum alloy.

6. An implement according to claim 5, wherein the tines comprise a wrought 7075-T6 aluminum alloy.

7. An implement according to claim 1,
    wherein (i) the array of tines is divided into two parts, about the longitudinal axis, by a central cleft region, devoid of tines, and (ii) any selected comb in the array has a number of tines greater than the number of combs in the array;
    so that, after the comb support has been drawn in the direction of motion along the longitudinal axis to effectuate the grooming of the hair of the animal, shed pet hair collected in the tines may be pinched within the cleft region to gain purchase, to facilitate manual cleaning of the implement.

8. An implement according to claim 1,
    wherein the tines of the array have an average thickness along their length of less than 3 mm.

9. An implement for grooming hair of an animal, comprising:
    a comb support having a longitudinal axis, and first and second opposed ends;
    an array of substantially rigid tines mounted to the comb support, each tine having (i) a base, by which it is mounted to the comb support, each base being mounted to the comb support in the same manner, (ii) a tip, (iii) a length that protrudes from the base to the tip, and (iv) a width at where the tine protrudes from its base, wherein the array is configured so that a selected tine has a length that is more than three times greater than the width of the selected tine, and so that a selected tine is physically separate from any adjacent tine over substantially all of a distance between the tip of the selected tine and the comb support,
    wherein spacing between successive pairs of adjacent combs decreases monotonically as a function of distance, along the longitudinal axis, of each successive pair from the first end to the second end, in a manner wherein there are at least three distinct spacings of pairs of adjacent combs;
    so that, as the comb support is drawn in a direction of motion along the longitudinal axis to effectuate the grooming of the hair of the animal, in a manner wherein the first end reaches a selected location on the animal and thereafter the second end reaches the selected location in one motion, the hair at the selected location experiences a progression in at least three stages from coarsely to more finely spaced pairs of adjacent combs to facilitate deshedding; and wherein the tines are configured to penetrate and groom the hair of the animal.

10. An implement according to claim 9, further comprising a handle, affixed to the comb support.

11. An implement according to claim 10, wherein the handle has a principal axis that is disposed parallel to the longitudinal axis.

12. An implement according to claim 9,
wherein the length of tines of a selected comb in the array monotonically decreases as a function of distance of the selected comb from the first end;
so that, as the comb support is drawn in the direction of motion along the longitudinal axis to effectuate the grooming of the hair of the animal, hair at the selected location experiences a progression from long to short tines.

13. An implement according to claim 12, wherein the array of tines is mounted to the comb support in a manner wherein the tips of the set of tines of each comb collectively define a surface that is curved.

14. An implement according to claim 9,
wherein each comb is established by mounting a row of tines to the comb support, and the tines have a thickness in cross-section where they are mounted to the comb support, and the thickness of the tines in a selected pair of adjacent combs in the array varies depending on the location of the selected pairs of combs along the longitudinal axis, with the thickness of tines of a selected comb monotonically decreasing as a function of distance of the selected comb from the first end;
so that, as the comb support is drawn in the direction of motion along the longitudinal axis to effectuate the grooming of the hair of the animal, hair at the selected location experiences a progression from thicker to thinner tines.

15. An implement according to claim 14, wherein the tines comprise a wrought aluminum alloy.

16. An implement according to claim 15, wherein the tines comprise a wrought 7075-T6 aluminum alloy.

17. An implement according to claim 9,
wherein the array of tines is divided into two parts by a central cleft region, devoid of tines, the cleft region interrupting regularity of spacing of tines in each comb and being disposed along the longitudinal axis, and any selected comb in the array having a number of tines that is greater than the number of combs in the array;
so that, after the comb support has been drawn in the direction of motion along the longitudinal axis to effectuate the grooming of the hair of the animal, shed pet hair collected in the tines may be pinched within the cleft region to gain purchase, to facilitate manual cleaning of the implement.

18. An implement for grooming hair of an animal, comprising:
a handle having a length defining a longitudinal axis of the implement;
a comb support defining a vertical direction that is normal to a surface of the support;
an array of substantially rigid tines mounted to the comb support, each tine having a tip and configured so that a selected tine is physically separate from any adjacent tine over substantially all of a distance between the tip of the selected tine and the comb support, the array having a plurality of generally parallel combs, wherein any selected comb in the array has a set of regularly spaced generally parallel tines of similar length and is disposed transversely with respect to the longitudinal axis, and each pair of adjacent combs defines an interstice that is transverse to the longitudinal axis and having a width defined by a distance between the corresponding pair of adjacent combs;
wherein (i) the array of tines is divided into parts by a cleft region, devoid of tines, the cleft region interrupting regularity of spacing of tines in each comb and being disposed along the longitudinal axis, and (ii) any selected comb in the array has a number of tines that is greater than the number of combs in the array;
a comb cleaner having a plurality of generally parallel bars, mounted to a central spine, the spine being mounted in the cleft region and configured for movement in the vertical direction, with each bar (a) disposed in a distinct one of the interstices, and (b) configured and constrained by mounting of the spine, so as to travel substantially the same vertical distance as the other bars, when the spine is moved in the vertical direction, so that the motion of the spine and the bars in a direction away from the comb support forces shed pet hair, collected in the tines, away from the comb support to facilitate cleaning of the implement.

19. An implement according to claim 18, wherein the comb cleaner includes a mounting mechanism, coupled to the comb support, and to which the generally parallel bars are mounted, and wherein the mounting mechanism includes:
a user-operable handle; and
a pantograph operably coupled between the comb cleaner and the user-operable handle, the pantograph configured to amplify the user's input actuating stroke of the user-operable handle to move the comb cleaner in a direction away from the comb support.

20. An implement according to claim 18, wherein the components of the comb cleaner and mounting mechanism comprise a wrought aluminum alloy.

21. An implement according to claim 20, wherein the components of the comb cleaner and mounting mechanism comprise a wrought 7075-T6 aluminum alloy.

22. An implement for grooming hair of an animal, comprising:
a handle having a length defining a longitudinal axis of the implement;
a comb support;
an array of substantially rigid tines mounted to the comb support, each tine having a tip and configured so that a selected tine is physically separate from any adjacent tine over substantially all of a distance between the tip of the selected tine and the comb support, the array having a plurality of generally parallel combs, any selected comb in the array having a set of regularly spaced generally parallel tines and disposed transversely with respect to the longitudinal axis;
wherein (i) the array of tines is divided into parts by a cleft region, devoid of tines, the cleft region interrupting regularity of spacing of tines in each comb and being disposed along the longitudinal axis, and having a width wider than a spacing between any pair of adjacent combs in the array, and (ii) any selected comb in the array has a number of tines that is greater than the number of combs in the array;
so that, after the comb support has been drawn to effectuate the grooming of the hair of the animal, shed pet hair collected in the tines may be pinched between the thumb and index finger within the cleft region to gain purchase, to facilitate manual cleaning of the implement.

23. An implement according to claim 22, wherein the comb support is made of a polymeric material and at least some of the tines are made of metal.

\* \* \* \* \*